US011347008B2

(12) United States Patent
Lu et al.

(10) Patent No.: US 11,347,008 B2
(45) Date of Patent: May 31, 2022

(54) FIBER OPTIC CONNECTION DEVICE WITH RUGGEDIZED TETHERS

(71) Applicant: CommScope Technologies LLC, Hickory, NC (US)

(72) Inventors: Yu Lu, Eden Prairie, MN (US); Randy Reagan, Morristown, NJ (US); Michael Noonan, Shrewsbury, MA (US); Jeffrey Gniadek, Northbridge, MA (US)

(73) Assignee: CommScope Technologies LLC, Hickory, NC (US)

( * ) Notice: Subject to any disclaimer, the term of this patent is extended or adjusted under 35 U.S.C. 154(b) by 129 days.

(21) Appl. No.: 16/790,077

(22) Filed: Feb. 13, 2020

(65) Prior Publication Data

US 2020/0257057 A1 Aug. 13, 2020

Related U.S. Application Data

(63) Continuation of application No. 14/957,221, filed on Dec. 2, 2015, now abandoned, which is a continuation
(Continued)

(51) Int. Cl.
*G02B 6/38* (2006.01)
*G02B 6/44* (2006.01)
*G01M 11/00* (2006.01)

(52) U.S. Cl.
CPC ........... *G02B 6/3827* (2013.01); *G01M 11/33* (2013.01); *G02B 6/385* (2013.01); *G02B 6/3823* (2013.01);
(Continued)

(58) Field of Classification Search
CPC .... G02B 6/3827; G02B 6/3823; G02B 6/385; G02B 6/3878; G02B 6/3885;
(Continued)

(56) References Cited

U.S. PATENT DOCUMENTS 2,047,152 A 7/1936 Mitchell
3,571,739 A 3/1971 Seidel
(Continued)

FOREIGN PATENT DOCUMENTS

DE 35 37 684 A1 4/1987
EP 0 115 725 A1 8/1984
(Continued)

OTHER PUBLICATIONS

"Cable Assemblies: Molding & Termination," http://www.dgo.com/prodcable.htm, 8 pages (Copyright 2001).
(Continued)

*Primary Examiner* — Peter Radkowski
(74) *Attorney, Agent, or Firm* — Merchant & Gould P.C.

(57) ABSTRACT

A loop back connector and methods for testing lines in a fiber optic network are disclosed. The loop back connector includes a ferrule having an interface side constructed for optical connection to a multifiber optical cable. The loop back connector also includes first and second optical loop back paths, each having first and second terminal ends positioned at the interface side. The terminal ends of each loop back path are adapted to be aligned to fibers in the multifiber optical cable. The method includes injecting a signal on a first optical path at a first location, looping back the signal at a second location onto a second optical path, and receiving the signal on the second optical path at the first location.

18 Claims, 22 Drawing Sheets

Related U.S. Application Data of application No. 13/771,376, filed on Feb. 20, 2013, now abandoned, which is a continuation of application No. 13/247,671, filed on Sep. 28, 2011, now abandoned, which is a continuation of application No. 12/505,862, filed on Jul. 20, 2009, now Pat. No. 8,041,178, which is a continuation of application No. 11/406,825, filed on Apr. 19, 2006, now Pat. No. 7,565,055.

(60) Provisional application No. 60/764,133, filed on Feb. 1, 2006, provisional application No. 60/672,534, filed on Apr. 19, 2005.

(52) U.S. Cl.
CPC ......... *G02B 6/3878* (2013.01); *G02B 6/3885* (2013.01); *G02B 6/3887* (2013.01); *G02B 6/3895* (2013.01); *G02B 6/447* (2013.01); *G02B 6/4472* (2013.01); *G02B 6/4473* (2013.01); *G02B 6/4475* (2013.01); *G02B 6/3849* (2013.01); *G02B 6/3897* (2013.01)

(58) Field of Classification Search
CPC .... G02B 6/3887; G02B 6/3895; G02B 6/447; G02B 6/4472; G02B 6/4473; G02B 6/4475; G02B 6/3849; G02B 6/3897; G01M 11/33

See application file for complete search history.

(56) References Cited

U.S. PATENT DOCUMENTS

| | | |
|---|---|---|
| 3,691,505 A | 9/1972 | Graves |
| 3,845,552 A | 11/1974 | Waltz |
| 3,879,575 A | 4/1975 | Dobbin et al. |
| 3,912,854 A | 10/1975 | Thompson et al. |
| 3,912,855 A | 10/1975 | Thompson et al. |
| 4,085,286 A | 4/1978 | Horsma et al. |
| 4,107,451 A | 8/1978 | Smith, Jr. et al. |
| 4,152,539 A | 5/1979 | Charlebois et al. |
| 4,322,573 A | 3/1982 | Charlebois |
| 4,343,844 A | 8/1982 | Thayer et al. |
| 4,405,083 A | 9/1983 | Charlebois et al. |
| 4,413,881 A | 11/1983 | Kovats |
| 4,467,137 A | 8/1984 | Jonathan et al. |
| 4,475,935 A | 10/1984 | Tanaka et al. |
| 4,481,380 A | 11/1984 | Wood et al. |
| 4,490,315 A | 12/1984 | Charlebois et al. |
| 4,512,628 A | 4/1985 | Anderton |
| 4,528,150 A | 7/1985 | Charlebois et al. |
| 4,528,419 A | 7/1985 | Charlebois et al. |
| 4,549,039 A | 10/1985 | Charlebois et al. |
| 4,550,220 A | 10/1985 | Kitchens |
| 4,556,281 A | 12/1985 | Anderton |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,701,574 A | 10/1987 | Shimirak et al. |
| 4,725,035 A | 2/1988 | Charlebois et al. |
| 4,732,628 A | 3/1988 | Dienes |
| 4,747,020 A | 5/1988 | Brickley et al. |
| 4,761,052 A | 8/1988 | Buekers et al. |
| 4,764,232 A | 8/1988 | Hunter |
| 4,818,824 A | 4/1989 | Dixit et al. |
| 4,822,434 A | 4/1989 | Sawaki et al. |
| 4,875,952 A | 10/1989 | Mullin et al. |
| 4,884,863 A | 12/1989 | Throckmorton |
| 4,910,727 A | 3/1990 | Fussganger |
| 4,913,512 A | 4/1990 | Anderton |
| 4,950,048 A | 8/1990 | Kakii et al. |
| 4,952,798 A | 8/1990 | Graham et al. |
| 4,961,623 A | 10/1990 | Midkiff et al. |
| 4,963,698 A | 10/1990 | Chang et al. |
| 4,982,083 A | 1/1991 | Graham et al. |
| 4,986,762 A | 1/1991 | Keith |
| 5,004,315 A | 4/1991 | Miyazaki |
| 5,039,456 A | 8/1991 | Bowen et al. |
| 5,042,901 A | 8/1991 | Merriken et al. |
| 5,046,811 A | 9/1991 | Jung et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,076,688 A | 12/1991 | Bowen et al. |
| 5,097,529 A | 3/1992 | Cobb et al. |
| 5,099,088 A | 3/1992 | Usami et al. |
| 5,115,105 A | 5/1992 | Gallusser et al. |
| 5,121,244 A | 6/1992 | Takasaki |
| 5,121,458 A | 6/1992 | Nilsson et al. |
| 5,125,060 A | 6/1992 | Edmundson |
| 5,168,124 A | 12/1992 | Takase et al. |
| 5,185,844 A | 2/1993 | Bensel, III et al. |
| 5,194,692 A | 3/1993 | Gallusser et al. |
| 5,210,812 A | 5/1993 | Nilsson et al. |
| 5,214,730 A | 5/1993 | Nagasawa et al. |
| 5,217,808 A | 6/1993 | Cobb |
| 5,241,611 A | 8/1993 | Gould |
| 5,245,151 A | 9/1993 | Chamberlain et al. |
| 5,335,408 A | 8/1994 | Cobb |
| 5,347,089 A | 9/1994 | Barrat et al. |
| 5,353,367 A | 10/1994 | Czosnowski et al. |
| 5,367,159 A | 11/1994 | Schofiled et al. |
| 5,367,593 A | 11/1994 | Lebby et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,655 A | 8/1995 | Kaplow et al. |
| 5,440,665 A | 8/1995 | Ray et al. |
| 5,442,726 A | 8/1995 | Howard et al. |
| 5,450,517 A | 9/1995 | Essert |
| 5,475,781 A | 12/1995 | Chang et al. |
| 5,491,766 A | 2/1996 | Huynh et al. |
| 5,509,202 A | 4/1996 | Abdow |
| 5,517,592 A | 5/1996 | Grajewski et al. |
| 5,528,718 A | 6/1996 | Ray et al. |
| 5,596,662 A | 1/1997 | Boscher |
| 5,657,413 A | 8/1997 | Ray et al. |
| 5,666,453 A | 9/1997 | Dannenmann |
| 5,680,234 A | 10/1997 | Darcie et al. |
| 5,684,911 A | 11/1997 | Burgett |
| 5,696,864 A | 12/1997 | Smith et al. |
| 5,708,753 A | 1/1998 | Frigo et al. |
| 5,734,776 A | 3/1998 | Puetz |
| 5,757,997 A | 5/1998 | Birrell et al. |
| 5,767,448 A | 6/1998 | Dong |
| 5,778,122 A | 7/1998 | Giebel et al. |
| 5,790,285 A | 8/1998 | Mock |
| 5,823,646 A | 10/1998 | Arizpe et al. |
| 5,825,963 A | 10/1998 | Burgett |
| 5,838,861 A | 11/1998 | Bunde |
| 5,861,575 A | 1/1999 | Broussard |
| 5,863,083 A | 1/1999 | Giebel et al. |
| 5,892,870 A | 4/1999 | Fingler et al. |
| 5,898,808 A | 4/1999 | Morlion et al. |
| 5,898,813 A | 4/1999 | Beier |

(56) References Cited

U.S. PATENT DOCUMENTS

| | | |
|---|---|---|
| 5,907,417 A | 5/1999 | Darcie et al. |
| 5,937,950 A | 8/1999 | Adams et al. |
| 5,945,633 A | 8/1999 | Ott et al. |
| 5,966,489 A | 10/1999 | Harwell et al. |
| 5,969,294 A | 10/1999 | Eberle et al. |
| 5,970,192 A | 10/1999 | Osugi et al. |
| 5,997,186 A | 12/1999 | Huynh et al. |
| RE36,592 E | 2/2000 | Giebel et al. |
| 6,086,263 A | 7/2000 | Selli et al. |
| 6,104,846 A | 8/2000 | Hodgson et al. |
| 6,104,855 A | 8/2000 | Jeon |
| 6,122,420 A | 9/2000 | Satoh |
| 6,122,423 A | 9/2000 | You et al. |
| RE37,028 E | 1/2001 | Cooke et al. |
| 6,181,861 B1 | 1/2001 | Wenski et al. |
| 6,215,930 B1 | 4/2001 | Estes et al. |
| 6,241,399 B1 | 6/2001 | Nobuhara |
| 6,255,584 B1 | 7/2001 | Renaud |
| 6,257,769 B1 | 7/2001 | Watanabe et al. |
| D449,275 S | 10/2001 | Goto |
| 6,343,950 B1 | 2/2002 | Eginton et al. |
| 6,376,774 B1 | 4/2002 | Oh et al. |
| 6,377,203 B1 | 4/2002 | Doany |
| 6,389,214 B1 | 5/2002 | Smith et al. |
| 6,407,338 B1 | 6/2002 | Smith |
| 6,439,776 B1 | 8/2002 | Harrison et al. |
| 6,439,777 B1 | 8/2002 | Harrison et al. |
| 6,454,464 B1 | 9/2002 | Nolan |
| 6,466,725 B2 | 10/2002 | Battey et al. |
| 6,493,500 B1 | 12/2002 | Oh et al. |
| 6,522,804 B1 | 2/2003 | Mahony |
| 6,539,160 B2 | 3/2003 | Battey et al. |
| D473,848 S | 4/2003 | Zheng et al. |
| 6,579,014 B2 | 6/2003 | Melton et al. |
| 6,583,867 B1 | 6/2003 | Jennings et al. |
| 6,592,268 B2 | 7/2003 | Chen et al. |
| 6,619,697 B2 | 9/2003 | Griffioen et al. |
| 6,621,975 B2 | 9/2003 | Laporte et al. |
| 6,648,520 B2 | 11/2003 | McDonald et al. |
| 6,654,523 B1 | 11/2003 | Cole |
| 6,655,016 B2 | 12/2003 | Renaud |
| 6,668,127 B1 | 12/2003 | Mahony |
| 6,706,968 B2 | 3/2004 | Yaworski et al. |
| 6,707,979 B2 | 3/2004 | Wang et al. |
| 6,738,555 B1 | 5/2004 | Cooke et al. |
| 6,764,220 B2 | 7/2004 | Griffiths et al. |
| 6,810,194 B2 | 10/2004 | Griffiths et al. |
| 6,819,842 B1 | 11/2004 | Vogel et al. |
| 6,856,748 B1 | 2/2005 | Elkins, II et al. |
| 6,880,219 B2 | 4/2005 | Griffioen et al. |
| 6,899,467 B2 | 5/2005 | McDonald et al. |
| 7,006,739 B2 | 2/2006 | Elkins, II et al. |
| 7,016,592 B2 | 3/2006 | Elkins, II et al. |
| 7,088,893 B2 | 8/2006 | Cooke et al. |
| 7,090,406 B2 | 8/2006 | Melton et al. |
| 7,090,407 B2 | 8/2006 | Melton et al. |
| 7,120,347 B2 | 10/2006 | Blackwell, Jr. et al. |
| 7,127,143 B2 | 10/2006 | Elkins et al. |
| 7,136,555 B2 | 11/2006 | Theuerkorn et al. |
| 7,146,090 B2 | 12/2006 | Vo et al. |
| 7,155,093 B2 | 12/2006 | Elkins, II et al. |
| 7,218,828 B2 | 5/2007 | Feustel et al. |
| 7,277,614 B2 | 10/2007 | Cody et al. |
| 7,333,708 B2 | 2/2008 | Blackwell, Jr. et al. |
| 7,352,924 B2 | 4/2008 | Gaebe et al. |
| 7,428,366 B2 | 9/2008 | Mullaney et al. |
| 7,469,091 B2 | 12/2008 | Mullaney et al. |
| 7,565,055 B2 | 7/2009 | Lu et al. |
| 7,653,282 B2 | 1/2010 | Blackwell, Jr. et al. |
| 8,041,178 B2 | 10/2011 | Lu et al. |
| 9,182,564 B2 | 11/2015 | Strasser et al. |
| 2003/0123838 A1 | 7/2003 | Wang et al. |
| 2003/0169422 A1 | 9/2003 | Mukai |
| 2004/0074852 A1 | 4/2004 | Knudsen et al. |
| 2004/0105613 A1 | 6/2004 | Chown |
| 2004/0123998 A1 | 7/2004 | Berglund et al. |
| 2004/0126069 A1 | 7/2004 | Jong et al. |
| 2004/0223720 A1 | 11/2004 | Melton et al. |
| 2004/0228589 A1 | 11/2004 | Melton et al. |
| 2004/0247265 A1 | 12/2004 | Takano et al. |
| 2005/0053341 A1 | 3/2005 | Zimmel |
| 2005/0053342 A1 | 3/2005 | Melton et al. |
| 2005/0069275 A1 | 3/2005 | Brants et al. |
| 2005/0111799 A1 | 5/2005 | Cooke et al. |
| 2005/0111800 A1 | 5/2005 | Cooke et al. |
| 2005/0129375 A1 | 6/2005 | Elkins, II et al. |
| 2005/0175308 A1 | 8/2005 | Elkins, II et al. |
| 2005/0259928 A1 | 11/2005 | Elkins, II et al. |
| 2005/0259929 A1 | 11/2005 | Elkins, II et al. |
| 2005/0259930 A1 | 11/2005 | Elkins, II et al. |
| 2005/0276552 A1 | 12/2005 | Cooke et al. |
| 2006/0028352 A1 | 2/2006 | McNamara et al. |
| 2006/0045428 A1 | 3/2006 | Theuerkorn et al. |
| 2006/0056782 A1 | 3/2006 | Elkins, II et al. |
| 2006/0093278 A1 | 5/2006 | Elkins, II et al. |
| 2006/0093303 A1 | 5/2006 | Reagan et al. |
| 2006/0120672 A1 | 6/2006 | Cody et al. |
| 2006/0147172 A1 | 7/2006 | Luther et al. |
| 2006/0153517 A1 | 7/2006 | Reagan et al. |
| 2007/0092178 A1 | 4/2007 | Gaebe et al. |
| 2007/0189696 A1 | 8/2007 | Van Koetsem et al. |
| 2013/0146355 A1 | 6/2013 | Strasser et al. |

FOREIGN PATENT DOCUMENTS

| | | |
|---|---|---|
| EP | 0 512 811 A1 | 11/1992 |
| EP | 0 903 604 A2 | 3/1999 |
| EP | 1 361 465 A1 | 11/2003 |
| EP | 1 380 828 A1 | 1/2004 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001-99946 | 4/2001 |
| JP | 2001-116968 | 4/2001 |
| JP | 2002-139651 | 5/2002 |
| JP | 2003-177254 | 6/2003 |
| JP | 2004-219944 | 8/2004 |
| WO | WO 2005/017591 A1 | 2/2005 |
| WO | WO 2005/119322 A1 | 12/2005 |
| WO | WO 2006/044080 A1 | 4/2006 |
| WO | WO 2006/050505 A1 | 5/2006 |
| WO | WO 2006/052355 A1 | 5/2006 |

OTHER PUBLICATIONS

"DAM/BLOK™ Electrical Splice Kit," http://www.pmiind.com/products/damblok.html, 2 pages (Copyright 2000).
"Factory Installed Termination Systems for Fiber Optic Cable Splices," 1 page (admitted as prior art as of the filed).
"Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).
"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).
FITEL, MPO Connector, MPO Patch Cord/Fan-Out Cord, Oct. 27, 2000, 4 pages.

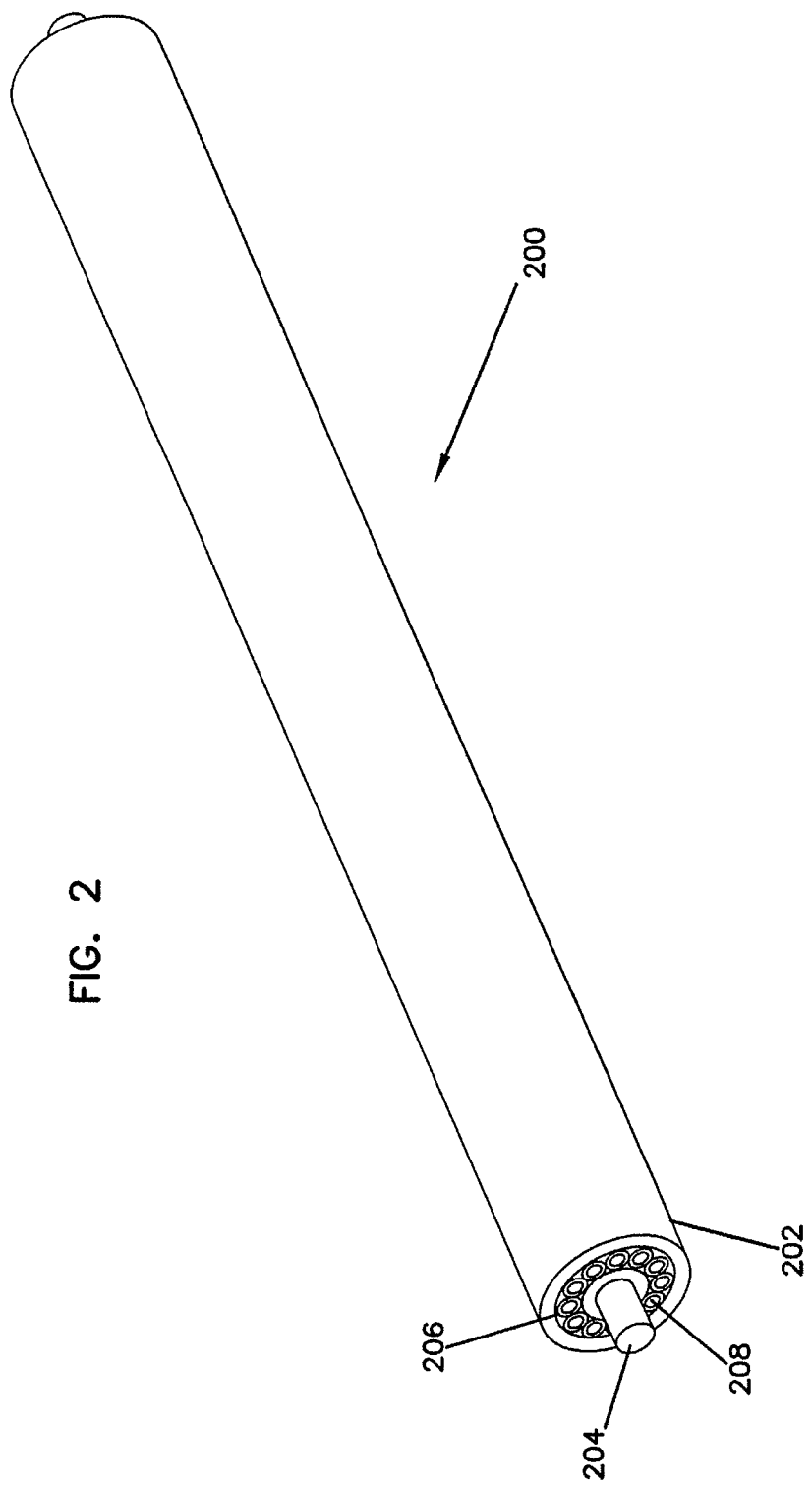

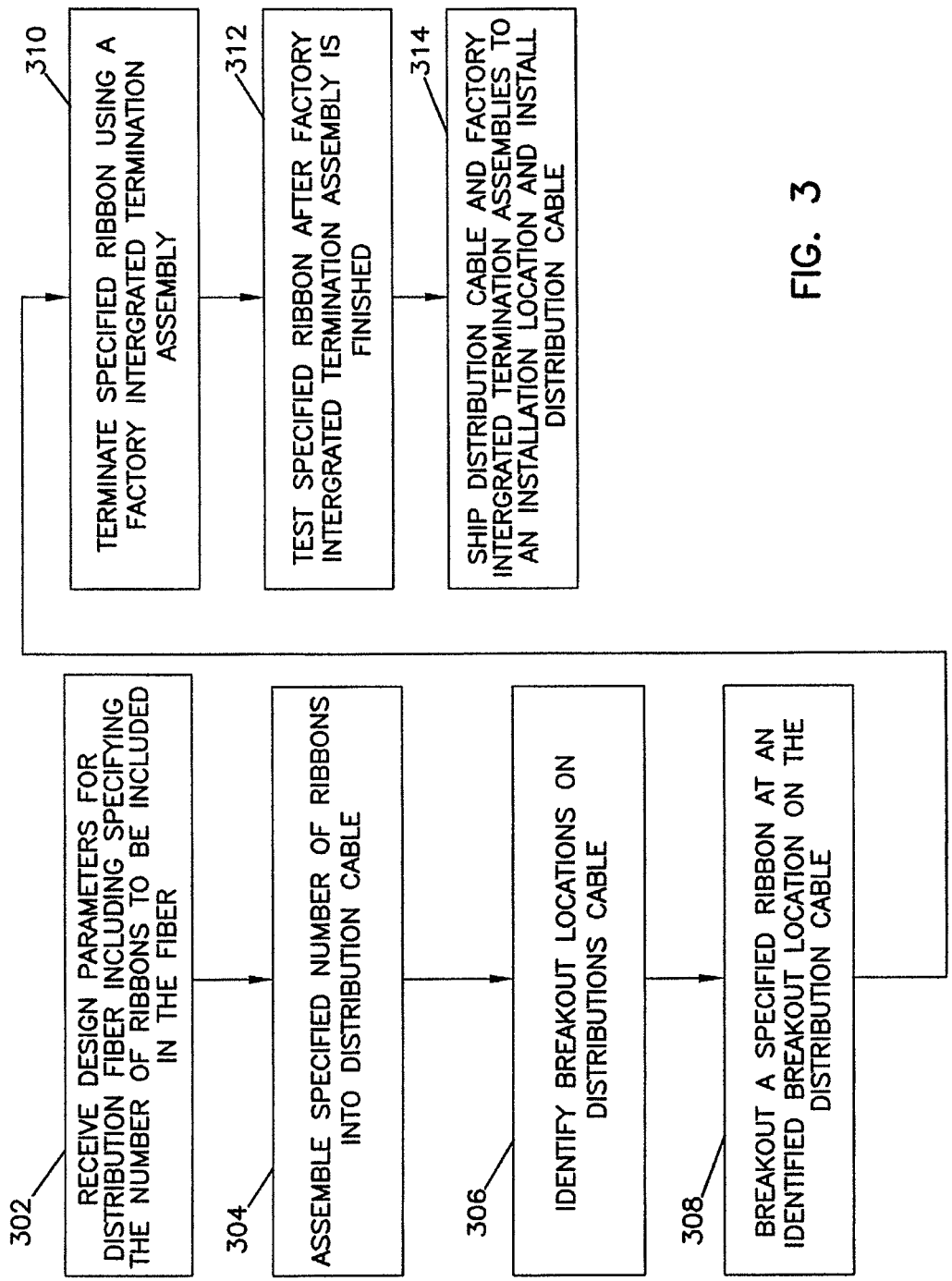

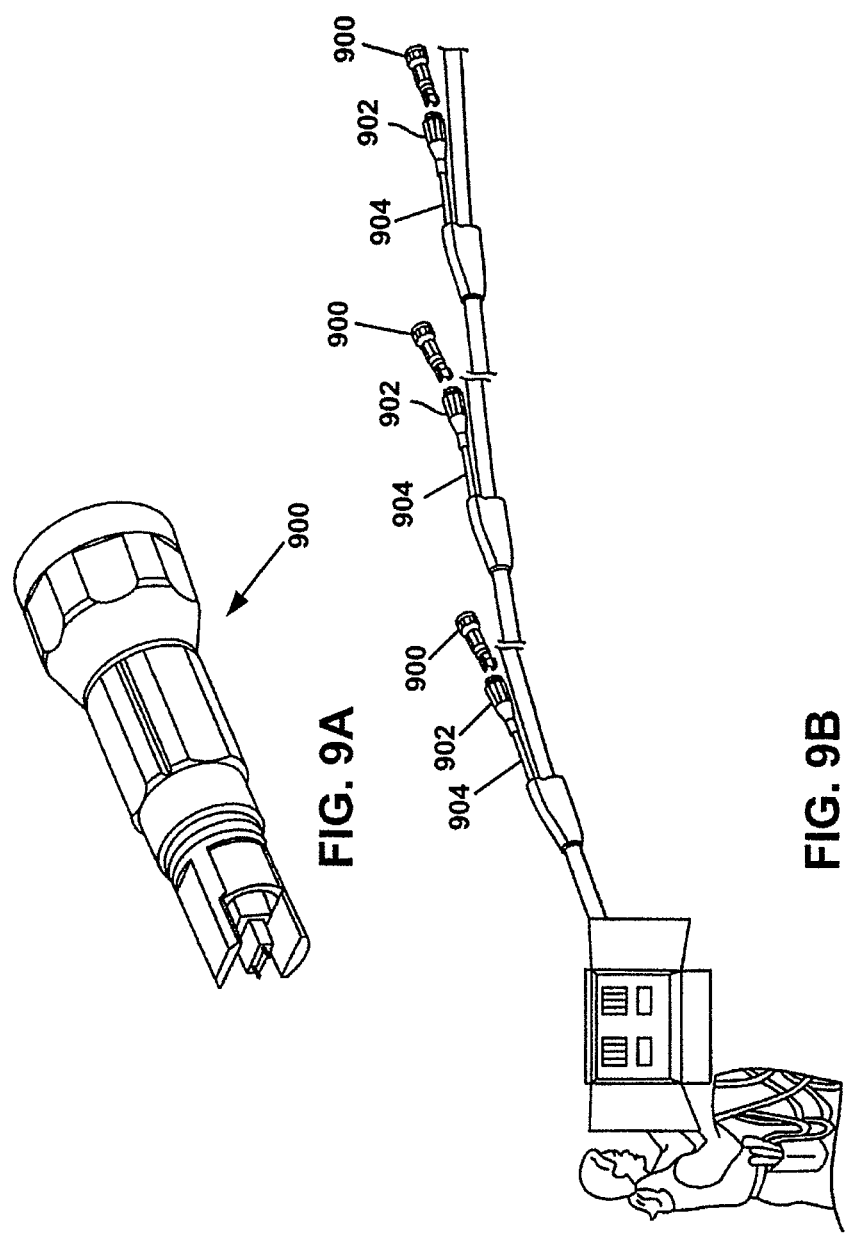

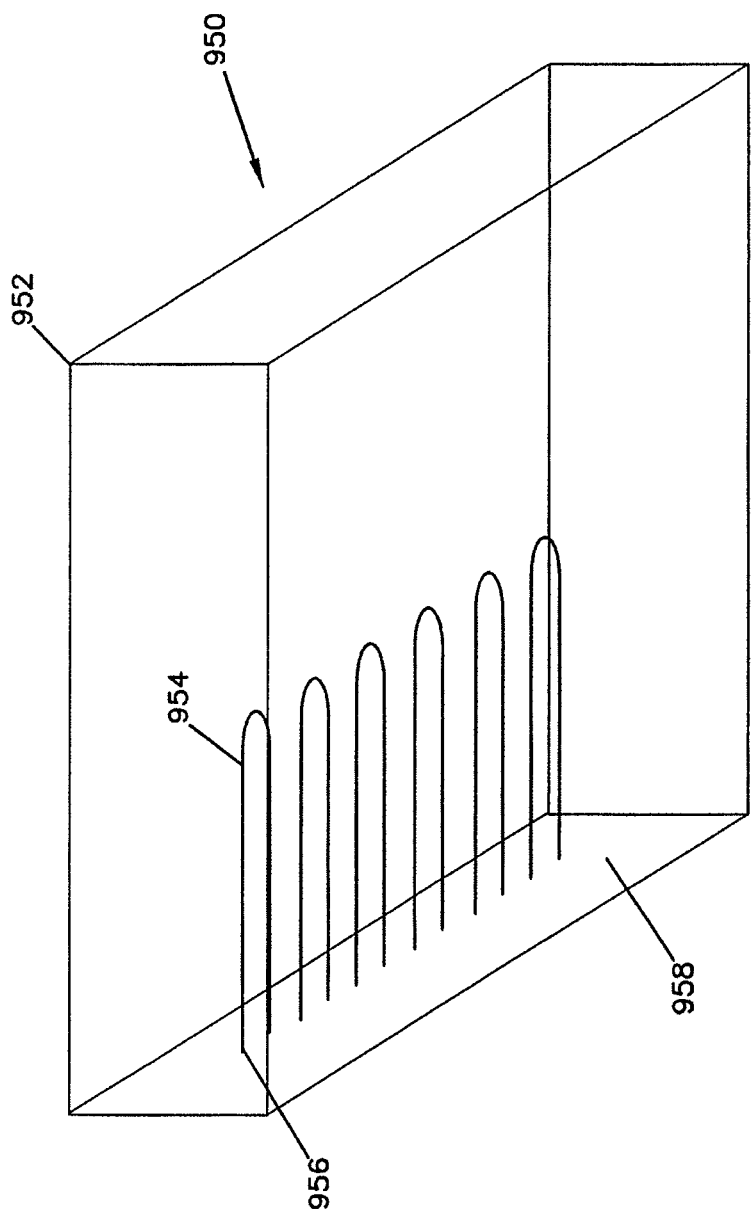

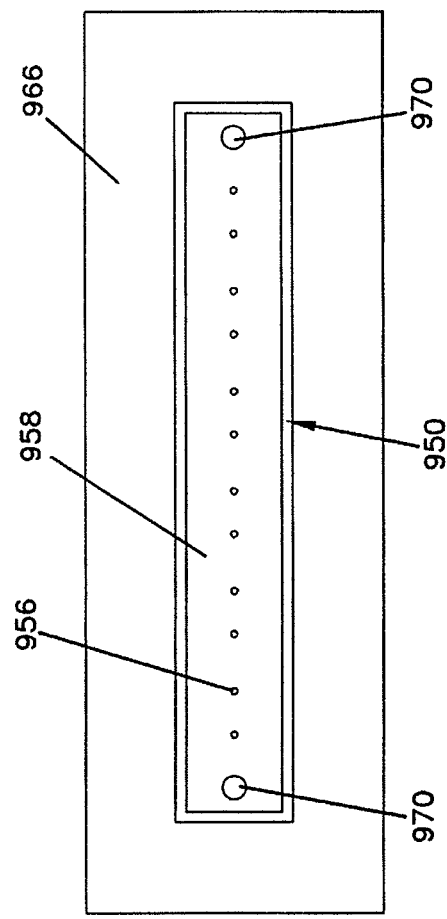

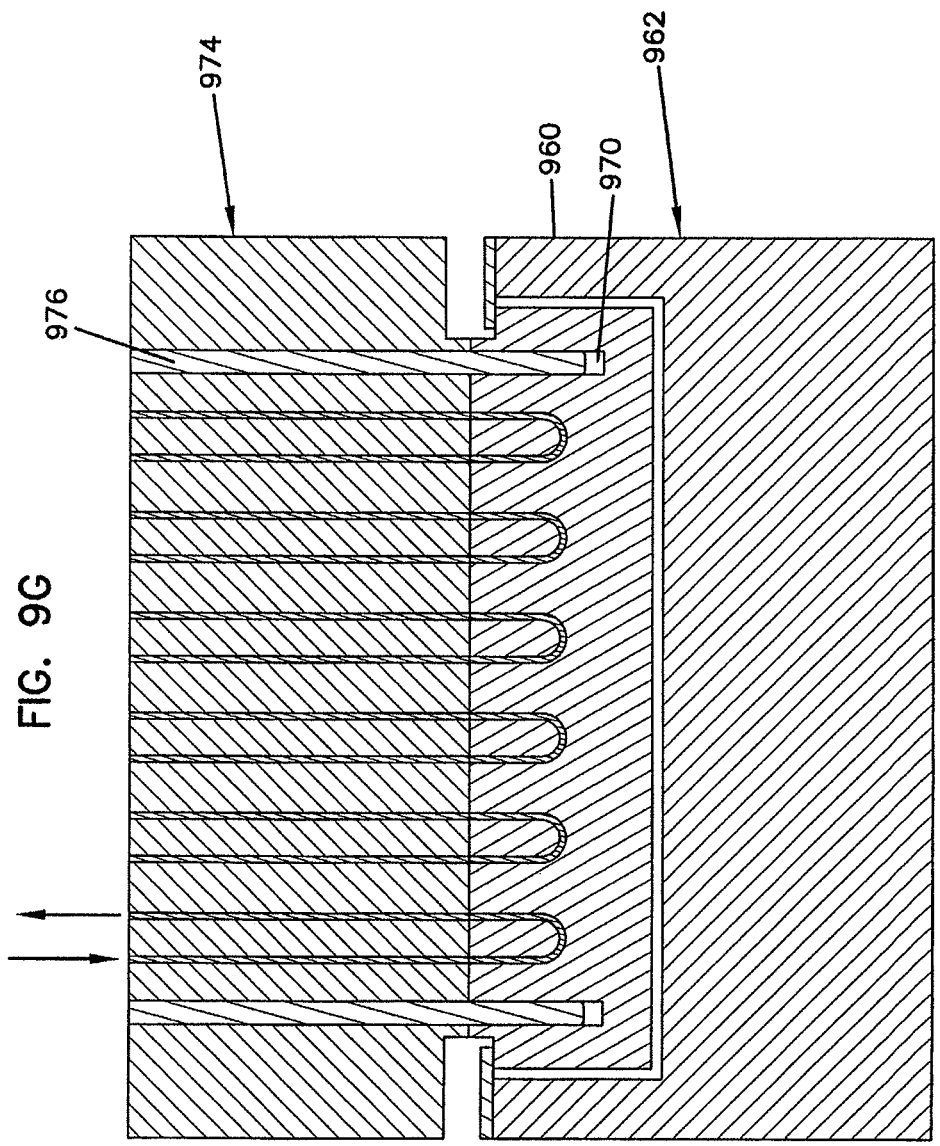

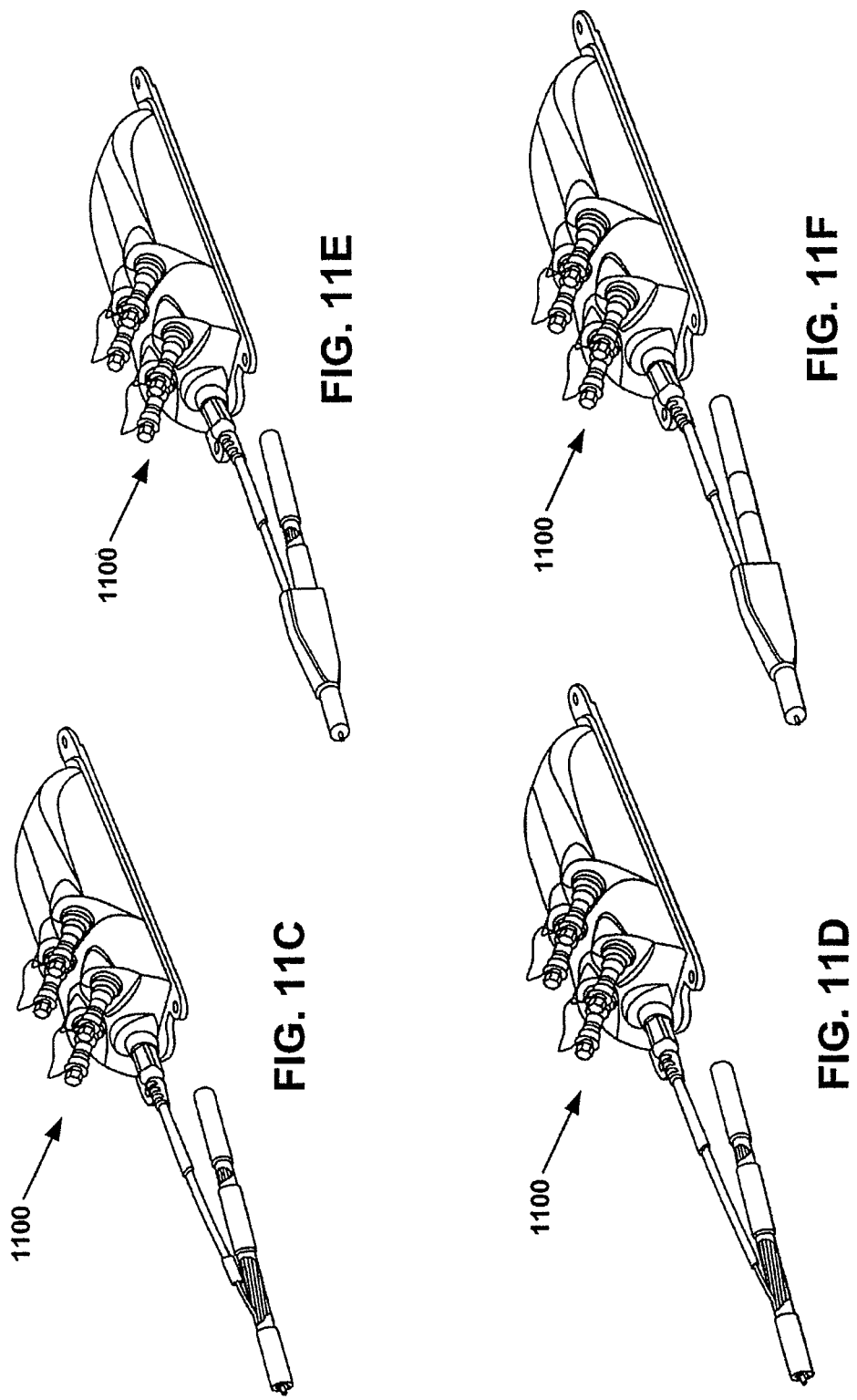

FIBER OPTIC CONNECTION DEVICE WITH RUGGEDIZED TETHERS

CROSS REFERENCE TO RELATED APPLICATIONS

This application is a continuation of application Ser. No. 14/957,221, filed Dec. 2, 2015, which is a continuation of application Ser. No. 13/771,376, filed Feb. 20, 2013, now abandoned, which is a continuation of application Ser. No. 13/247,671, filed Sep. 28, 2011, now abandoned, which is a continuation of application Ser. No. 12/505,862, filed Jul. 20, 2009, now U.S. Pat. No. 8,041,178, which is a continuation of application Ser. No. 11/406,825, filed Apr. 19, 2006, now U.S. Pat. No. 7,565,055, which claims the benefit of provisional application Ser. No. 60/672,534, filed Apr. 19, 2005 and claims the benefit of provisional application Ser. No. 60/764,133, filed Feb. 1, 2006, which applications are incorporated herein by reference in their entirety.

TECHNICAL FIELD

The present invention relates to fiber optic cable networks. More specifically, the present invention relates to termination of fiber optic cables.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and cost and may increase network reliability.

Passive optical networks may employ optical splitters to take a signal from a single incoming fiber and make it available to a number of output fibers. For example, a distribution cable may include 24 optical fibers and may run from a central office to a distribution location, such as an equipment enclosure. At the equipment enclosure, each fiber in the distribution cable may be split into a number of outgoing fibers which are made available to subscribers. For example, passive optical networks may employ 1:2, 1:4, 1:8, 1:16 and 1:32 splitting ratios for making optical data available to subscriber locations. Outgoing fibers from the equipment enclosure, i.e. at the output of the optical splitters, need to be attached to subscriber locations. Since the outgoing fibers may be housed in a cable for protection, a subset of the fibers needs to be accessed and made available to a like number of subscribers.

Current techniques employ splices for breaking a subset of fibers out of a distribution cable. These splices are normally performed in the field using trained personnel after the distribution cable is installed. This form of splicing is referred to as manual splicing, or field splicing. Manual splicing may be time consuming and may be expensive in terms of labor because personnel must be specially trained and performing splicing operations may be time intensive. In addition, material costs associated with splicing cables may be expensive since splice enclosures need to be environmentally secure within a wide range of variables. Manual splicing may also require specialized tools.

Passive optical networks may be extended via connectors located along the distribution cable, creating branched optical paths. Branch cables may be connected to these connectors after the distribution cable is installed, for example because no subscribers were located near the distribution cable when it was originally installed. A technician or other personnel installing a branch cable from the connector location to a subscriber location generally tests the link between a central office and the connector to ensure optical continuity at the time the branch cable is installed. Testing typically involves travel between the central office location and the connector location to inject a signal at one location and detect that signal at the second location. The distance between the central office and the connector location may be substantial, and require time-consuming travel by the technician.

SUMMARY

According to the present disclosure, a loop back connector and methods for testing lines in a fiber optic network are disclosed. The loop back connector has a ferrule, and can include loop back paths for connecting fibers in a multifiber optical cable. The ferrule has an interface side adapted to be aligned to a multifiber optical connector. The loop back paths in the ferrule optically connect two fibers in the multifiber optical connector. In certain embodiments, the loop back plug can include a planar lightwave circuit.

A method for testing lines in a fiber optic network is also disclosed. The method includes inputting a signal onto a first optical path at a first location, looping back the signal at a second location to a second optical path and receiving the signal from the second optical path at the first location. A loop back connector can be used at the second location to loop back the signal to the first location.

BRIEF DESCRIPTION OF THE DRAWINGS

FIG. 2 illustrates an exemplary distribution cable that may be spliced using factory integrated terminations consistent with the principles of the invention;

FIG. 3 illustrates an exemplary method for manufacturing a distribution cable for use with a factory integrated termination consistent with the principles of the invention;

FIGS. 9A and 9B illustrate an exemplary loop back connector for use in testing factory integrated terminations consistent with the principles of the invention;

FIG. 9D shows a planar lightwave chip suited for use in a loop-back connector;

FIG. 9F is a top view taken along section line 9F-9F of FIG. 9E;

FIG. 9G shows the connectors of FIG. 9E coupled together;

FIGS. 11A-11F illustrate exemplary implementation of factory integrated terminations employing fiber drop terminals consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Figure 1A:
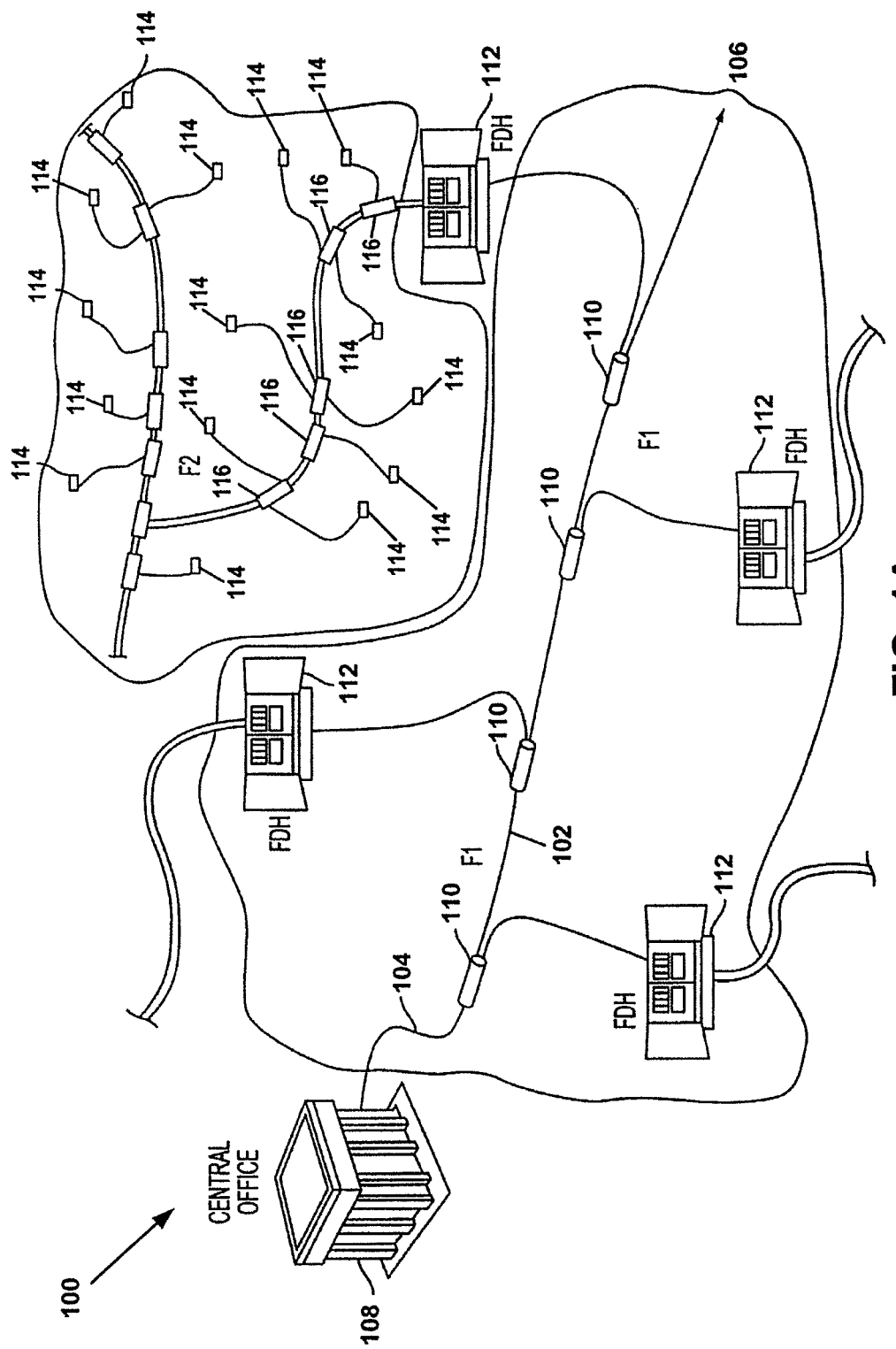
FIGS. 1A-C illustrate exemplary networks that may use factory integrated terminations consistent with the principles of the invention.
Figure 1B:
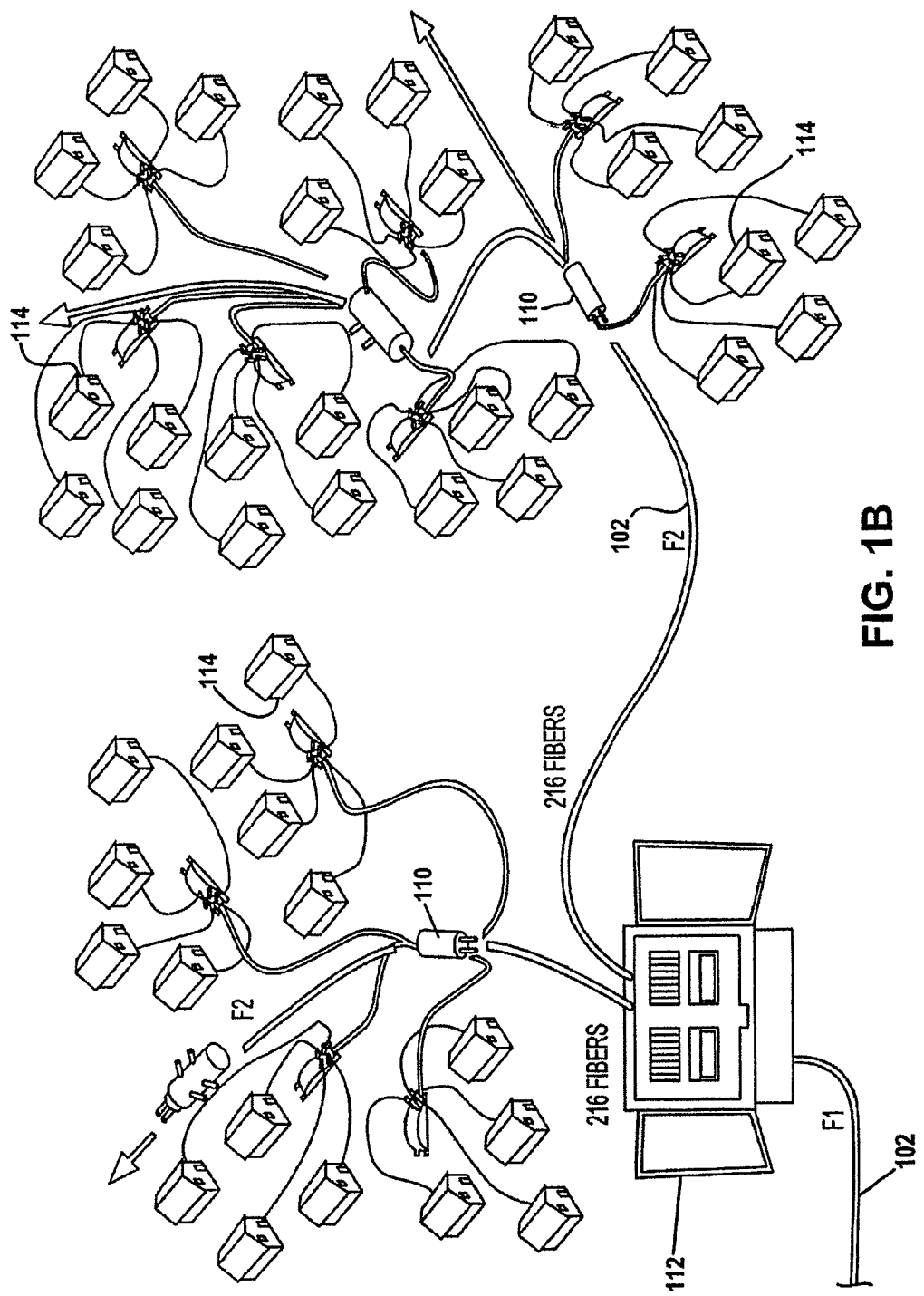
Figure 1C:
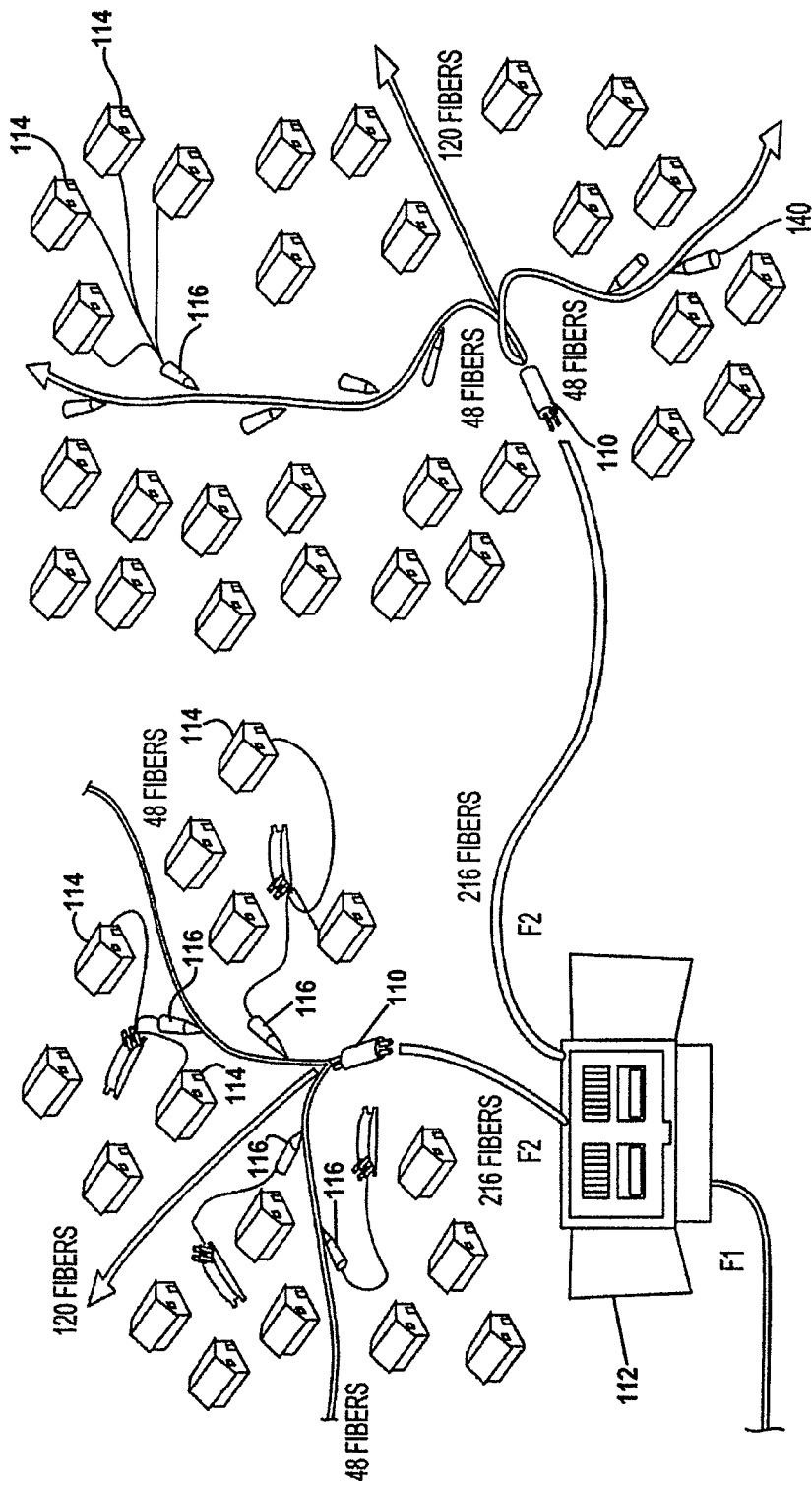

FIGS. 1A-C illustrate exemplary networks 100 that may use factory integrated terminations consistent with the principles of the invention. A fiber distribution cable 102 may include a proximal end 104 and a distal end 106. The proximal end 104 may be associated with a central office 108 and may act as the beginning of the distribution cable 102. The distal end 106 may be located some distance away from the proximal end 104 and may act as the end of the distribution cable 102. One or more splices 110 may be located between the proximal end 104 and distal end 106 of the distribution cable 102. For example, as a fiber distribution cable 102 is spliced into smaller cables, the overall number of cables associated with the distribution cable 102 may increase while the number of fibers remains constant. In some applications, the number of splices 110 may increase geometrically as splice locations move away from the proximal end 104 of the distribution cable 102.

The portion of a passive optical network 100 that is closest to the beginning of a distribution cable 102 (the central office 108) is generally referred to as the F1 region, where F1 is the "feeder fiber" from the central office 108 to a location before a splitter, such as a splice 110. The F1 portion of the network 100 may include a distribution cable 102 having on the order of 12 to 48 fibers; however, alternative implementations may include fewer or more fibers without departing from the spirit of the invention. For example, a feeder cable such as the distribution cable 102 may run from a central office 108 to a fiber distribution hub (FDH) 112 that includes one or more optical splitter modules, seen as splices 110. An FDH 112 is an equipment enclosure that may include a plurality of optical splitters for splitting an incoming fiber in the distribution cable 102 into a number of output fibers. For example, an incoming fiber in the distribution cable 102 may be split into 32 outgoing fibers using an optical splitter module within the FDH 112. Each output of the splitter module may be connected to a subscriber termination on a patch panel within the FDH 112. The subscriber termination may be coupled to an optical fiber in another distribution cable 102 that may run to a location 114 proximate to the subscriber's premises.

Splitters used in an FDH 112 may accept a feeder cable having a number of fibers and may split those incoming fibers into anywhere from 216 to 432 individual distribution fibers that may be associated with a like number of subscriber locations 114. These 216 to 432 fibers may make up an F2 distribution cable, or F2 portion of the network. F2 may refer to fibers running from an FDH 112 to subscriber locations 114.

Factory integrated terminations may be used in the F2 region to provide environmentally sound and cost effective splicing protection. Factory integrated terminations may use factory integrated access (tap) points 116 at specified points in the distribution cable 102 instead of manually installed splices 110. These access points 116 may be connectorized to provide a simple plug and play approach in the distribution portion of the network 100 when connecting subscribers to the network. For example, implementations consistent with the principles of the invention may use rugged OSP connectors that can accommodate single or multi-port connectors.

FIG. 2 illustrates an exemplary distribution cable 200 that may be spliced using factory terminations consistent with the principles of the invention. The distribution cable of FIG. 2 may include a protective outer sheath 202 that provides strength and abrasion resistance to optical fibers running inside the distribution cable. The outer sheath 202 may be manufactured from UV resistant plastic and may include reinforcing fibers. The distribution cable 200 may also include a strength member 204 passing through the center of the cable 200. The strength member 204 may be used to tension the distribution cable 200 without damaging or stretching optical fibers running inside the cable 200.

The distribution cable 200 may also include fiber ribbons 206. For example, a distribution cable 200 may include one or more fiber ribbons 206. A fiber ribbon 206 may include 4, 6, 8, 12, or more optical fibers enclosed within a protective ribbon sheath 208. The ribbon sheaths 208 may be color coded and/or labeled to facilitate identification of a desired ribbon. Ribbon sheaths 208 may be structural plastic tubes for providing additional protection to fibers making up a ribbon 206. A typical distribution cable 200 may include 48 to 432 individual fibers that may be contained in anywhere from 8 to 108 ribbons.

When distribution cables 200 contain a large number of ribbons 206, it may become difficult to retrieve a desired ribbon from a cable to perform a manual splice and/or a factory integrated termination. Implementations consistent with the principles of the invention may employ an optical fiber having on the order of 12 ribbon tubes with each ribbon tube including on the order of four optical fibers. Distribution fibers having 12 ribbon tubes facilitate easy identification of a desired ribbon when performing splices. As a result, the time required to perform a manual splice and/or a factory integrated termination may be reduced.

FIG. 3 illustrates an exemplary method for manufacturing a distribution cable for use with factory integrated terminations consistent with the principles of the invention. The method of FIG. 3 commences with the receipt of one or more design parameters for a distribution cable (act 302). For example, a design parameter may indicate that a distribution cable should include 12 ribbons with each ribbon having four optical fibers. A desired number of fiber ribbons may be assembled into a distribution cable (act 304). Breakout locations for factory integrated terminations may be identified (act 306). For example, breakout locations may correspond with geographic locations of utility poles or ground mounted pedestals. A desired ribbon may be broken out of the assembled distribution cable at a determined location (act 308). The portion of ribbon broken out of the distribution cable may be terminated using a factory integrated termination (act 310). The terminated ribbon may be tested for signal integrity and environmental integrity after the installation of the factory integrated termination is complete (act 312). The distribution cable may be shipped to an installation location and installed (act 314).

Figure 4:
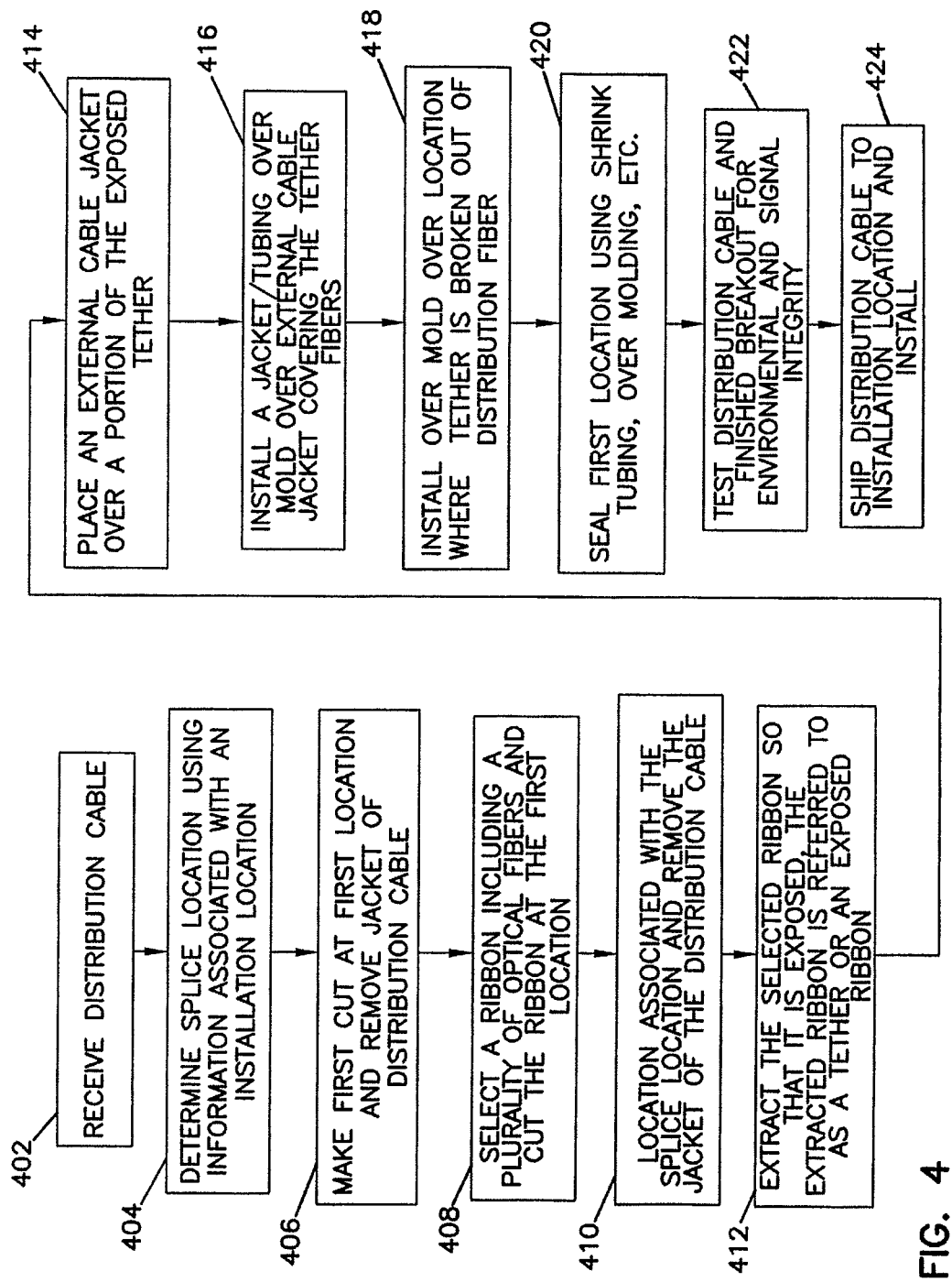
FIG. 4 illustrates an exemplary method for installing a factory integrated termination onto a distribution cable consistent with the principles of the invention.

FIG. 4 illustrates an exemplary method for installing a factory integrated termination onto a distribution cable consistent with the principles of the invention. A distribution cable may be received at an assembly facility (act 402). Splice locations may be determined using information associated with one or more installation locations (act 404). A cut may be made in the jacket of the distribution cable at a first location associated with a splice location (act 406). For example, in one implementation, a piece of jacket approximately 0.25 inches in length may be removed from the distribution cable at the first location to provide access to one or more ribbons contained therein.

A ribbon may be selected and the ribbon jacket/sheath along with the fibers making up the ribbon may be severed at the first location (act 408). A second cut may be made in the outer jacket of the distribution cable at a second location, which is a determined distance away from the first location (act 410). The outer jacket of the distribution cable may be removed at the second location to provide access to ribbons contained therein. The ribbon that was cut in act 408 is identified and the ribbon is pulled out of the distribution fiber from the second location (act 412). For example, in one implementation, the second cut is made approximately 78 inches (on the order of 2 meters) away from the first cut. When the ribbon is pulled from the distribution cable, approximately 78 inches of the ribbon will be exposed outside of the distribution cable.

An external cable sheath may be placed over the extracted ribbon to provide additional structural rigidity and environmental protection (act 414). For example, a piece of UV resistant structural shrink tubing may be placed over the extracted ribbon. A jacket/tubing over-mold may be installed over the external cable jacket that was installed in act 414 (act 416). The jacket/tubing over-mold may be coupled to the external jacket using adhesive or other attachment technique known in the art. An over-mold may be installed over the second location including the extracted ribbon, external jacket and/or jacket/tubing over-mold (act 418). The over-mold may operate to seal the outer jacket of the distribution cable at the second location and may seal the exposed ribbon and may maintain the ribbon at a desired position with respect to the distribution cable. The over-mold may also provide structural integrity to the second location and to the exposed ribbon.

The over-mold may include a poured plastic covering molded over the exposed portions of the distribution cable. The over-mold may overlap the intact distribution cable jacket at each end of the second cut. The cured over-mold may produce a strong weather-tight seal around the distribution cable and the exposed ribbon and/or ribbon jacket.

An alternative implementation of an over-mold may employ a two-piece pre-formed clamshell that closes over the junction of the distribution cable and exposed ribbon forming a strong weather-tight seal around the 48-fiber cable as well as the 4-fiber ribbon jacket. Another alternative process may be a heat-shrink/gasket material combination covering the junction of the distribution cable as well as the exposed ribbon.

Another alternate design may include an MT female connector within the over-mold. This design may eliminate the need for a jacket over the exposed ribbon. The ribbon may be terminated to an MT female connector. The MT female connector may be captured with the over-mold. The over-mold may be configured and adapted to pass over cable installation pulleys when the distribution cable is deployed in the field.

The first location may be sealed using shrink tubing, over-molding and/or other techniques known in the art (act 420). The distribution cable and exposed ribbon may be tested for signal integrity and/or environmental integrity (act 422). The distribution cable may be shipped to an installation location and installed (act 424). For example, the distribution cable may be suspended between utility poles with the factory integrated terminations located so as to correspond to utility pole locations. The factory integrated terminations may be terminated with connectors, receptacles, and/or other devices used for making optical signals available to a subscriber.

Implementations of factory integrated terminations may allow the distribution cable to maintain its original strength and lifetime performance. The over-mold may be designed to withstand the tough OSP environment, and may add minimal weight to the cable.

Figure 5B:
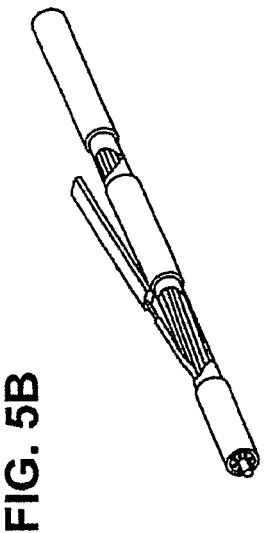
FIGS. 5A-5D illustrate exemplary aspects associated with the installation of a factory integrated termination onto a distribution cable consistent with the principles of the invention.
Figure 5D:
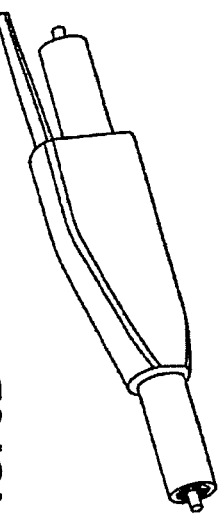
Figure 5A:
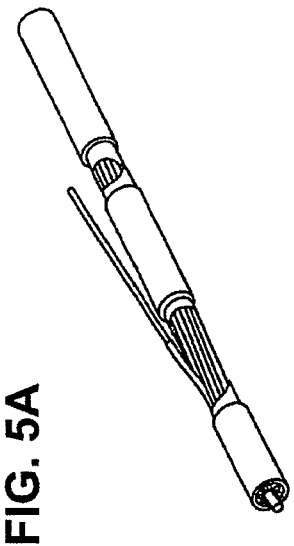
Figure 5C:
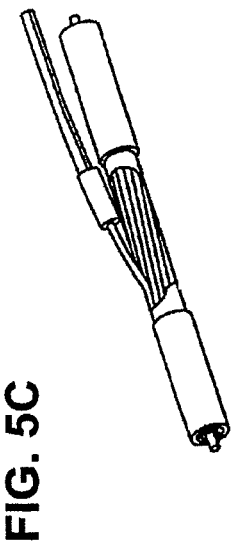

FIGS. 5A-5D illustrate exemplary aspects associated with the installation of a factory integrated termination onto a distribution cable consistent with the principles of the invention. FIG. 5A illustrates the operations described in conjunction with acts 406-412 of FIG. 4. FIG. 5B illustrates the operations described in conjunction with act 414 of FIG. 4. FIG. 5C illustrates the operations described in conjunction with act 416 of FIG. 4. FIG. 5D illustrates the operations described in conjunction with act 418 of FIG. 4.

Figure 5E:
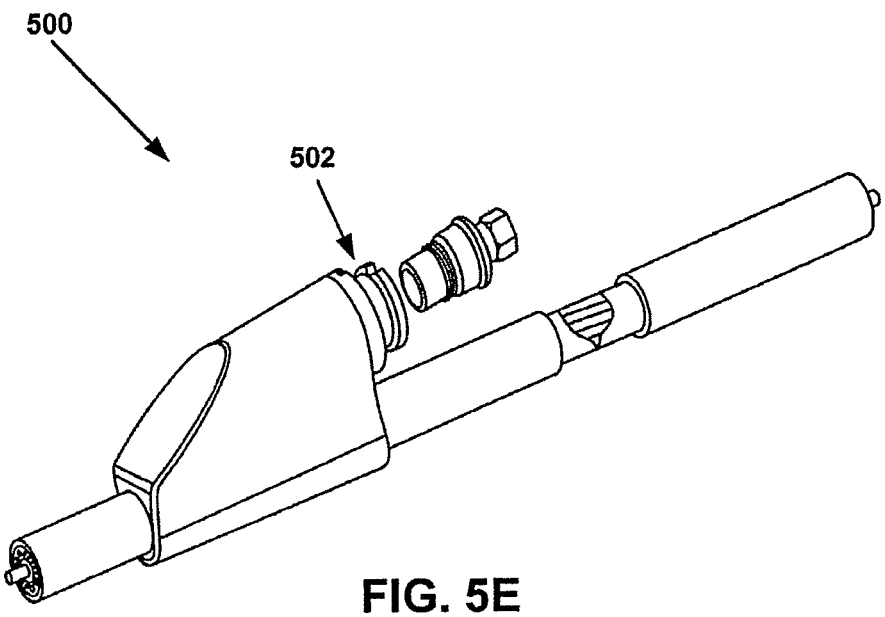
FIGS. 5E-5F illustrate views of an exemplary factory integrated termination that includes an MT female connector consistent with the principles of the invention.
Figure 5F:
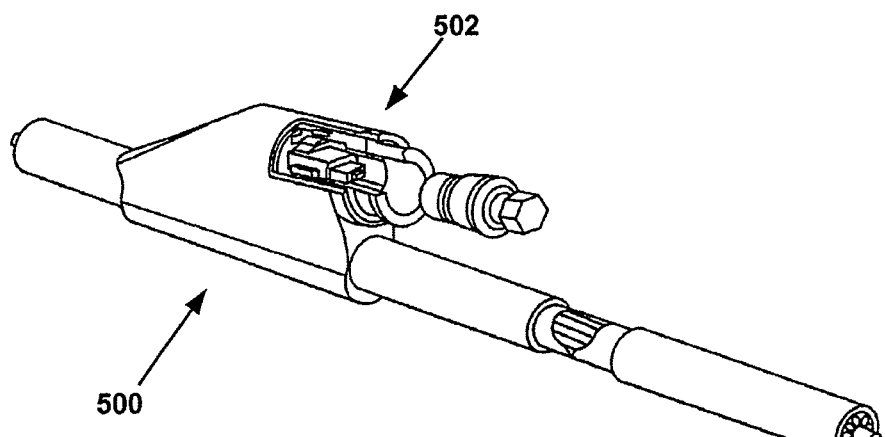

FIGS. 5E and 5F illustrate views of an exemplary factory integrated termination 500 that includes an MT female connector 502 consistent with the principles of the invention. Implementations of the factory integrated termination may be equipped with connectors and/or receptacles to facilitate easy connection of distribution devices such as fiber distribution hubs and connectorized-tethers. This implementation may eliminate the need for a jacket over the exposed ribbon since the ribbon is terminated directly to an MT female connector 502 within the over-mold.

Figure 6:
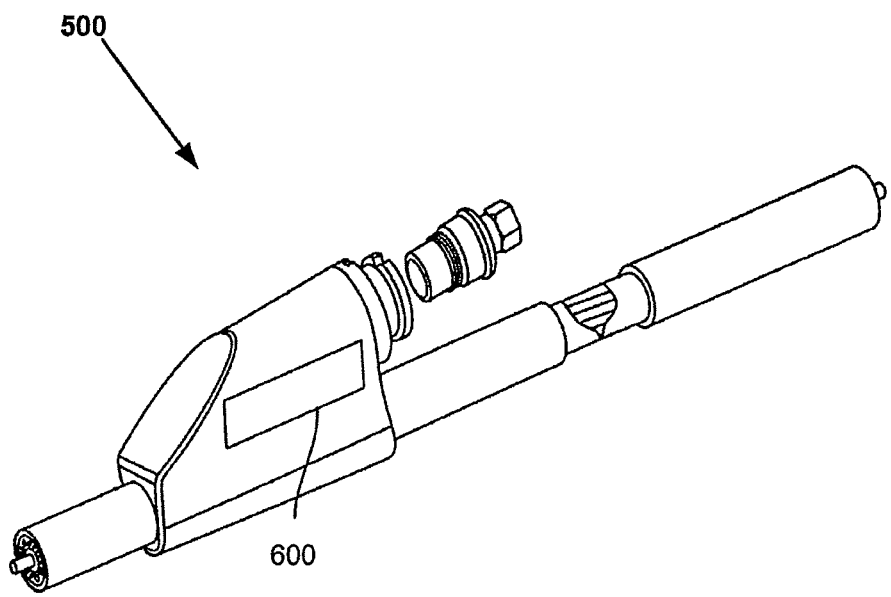
FIG. 6 illustrates the exemplary factory integrated termination of FIG. 5E configured to include a radio frequency identification (RFID) tag consistent with the principles of the invention.

FIG. 6 illustrates the exemplary factory integrated termination 500 of FIG. 5E configured to include an radio frequency identification (RFID) tag 600 consistent with the principles of the invention. Implementations of factory integrated terminations may be equipped with RFID tags to facilitate the inclusion of machine-readable information into splice locations. RFID tags are devices that can store information and transmit information using radio frequency waves. RFID tags may be passive devices that do not include a power source or they may be active. Passive RFID tags are queried using a radio frequency signal from a transceiver. When irradiated with radio frequency energy, passive RFID tags become low powered transmitters. The querying transceiver may read transmissions from the RFID tag.

In contrast, active RFID tags may include a power source, such as a battery. Active RFID tags may perform more complex operations and may transmit over greater distances as compared to passive RFID tags. An active RFID tag may be in a sleep mode until it is queried by a transceiver. When queried, the active RFID tag may turn on a transmitter and may transmit information to the transceiver.

RFID tags may receive information for storage via radio frequency or they may be programmed when they are manufactured using techniques known in the art. When queried, RFID tags may send the stored information to a querying device. For example, an RFID tag 600 can be encoded with information about the geographic location of the splice and with information about subscribers that are connected to fibers attached to a breakout, or splice. When queried, the RFID tag 600 may make the encoded information available to the querying device.

Figure 7:
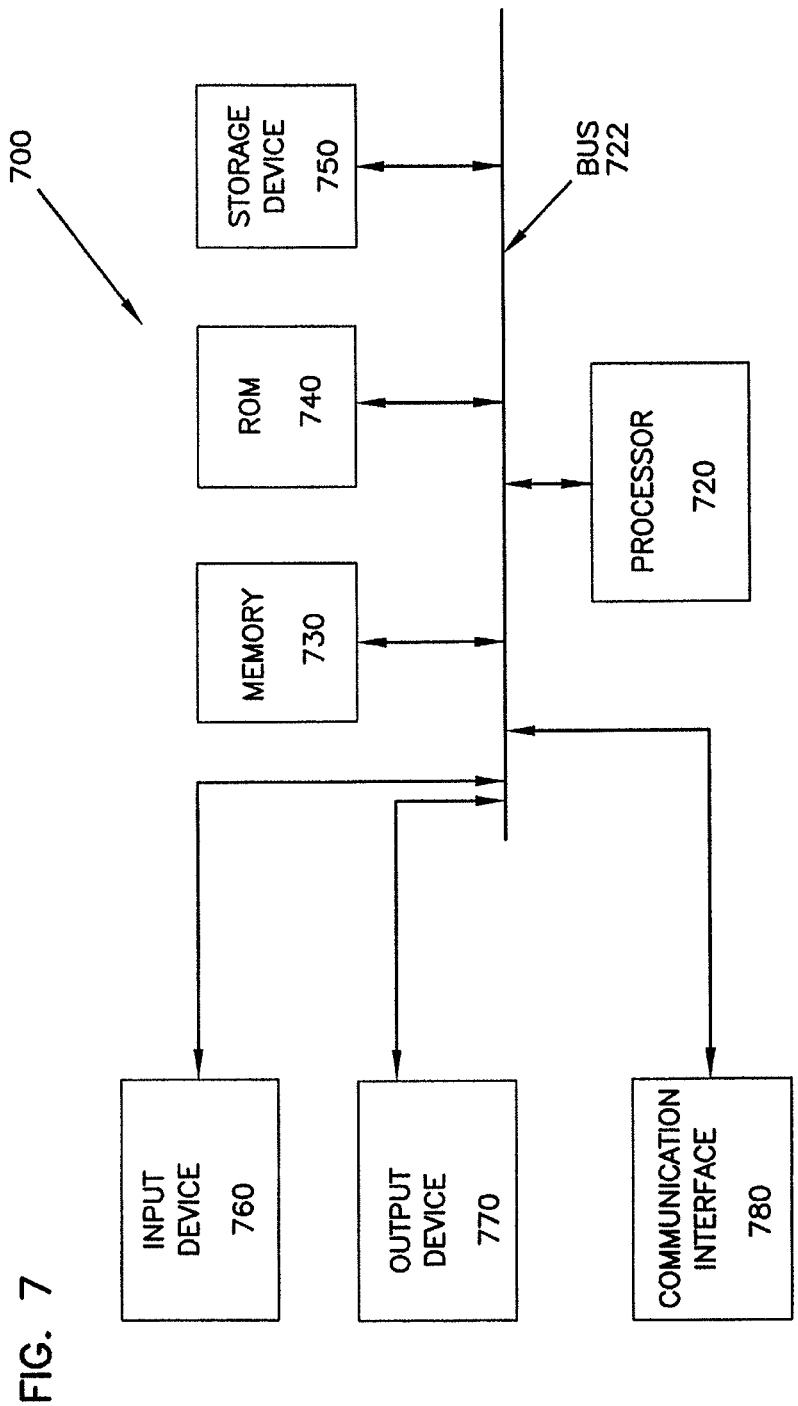
FIG. 7 illustrates an exemplary computer architecture that may be used for implementing active RFID devices consistent with the principles of the invention.

FIG. 7 illustrates an exemplary device architecture that may be used for implementing active RFID tags consistent with the principles of the invention. Architecture 700 may also be implemented in computers, querying devices, RFID programming devices, and devices used for testing factory integrated termination assemblies without departing from the spirit of the invention. The implementation illustrated in conjunction with FIG. 7 is exemplary and other configurations may alternatively be used.

Architecture 700 may include a processor 720, a bus 722, a memory 730, a read only memory (ROM) 740, a storage device 750, an input device 760, an output device 770, and a communication interface 780. Bus 722 permits communication among the components of architecture 700 and may include optical or electrical conductors capable of conveying data and instructions.

Processor 720 may include any type of conventional processor, microprocessor, or processing logic that may interpret and execute instructions, and may be implemented in a standalone or distributed configuration such as in a parallel processor configuration. Memory 730 may include a random access memory (RAM) or another type of dynamic storage device that stores information and instructions for execution by processor 720. Memory 730 may also be used to store temporary variables or other intermediate information during execution of instructions by processor 720.

ROM 740 may include a conventional ROM device and/or another static storage device that stores static information and instructions for processor 720. Storage device 750 may include a magnetic disk or optical disk and its corresponding drive and/or some other type of magnetic or optical recording medium and its corresponding drive for storing information and instructions.

Input device 760 may include one or more conventional interfaces, components, and/or mechanisms that permit an operator to input information to architecture 700, such as a keyboard, a mouse, a pen, voice recognition and/or biometric mechanisms, etc. Output device 770 may include one or more conventional mechanisms that output information to an operator and may include a display, a printer, one or more speakers, etc. Communication interface 780 may include any transceiver-like mechanism that enables architecture 700 to communicate with other devices and/or systems. For example, communication interface 780 may include a wireless transceiver for communicatively coupling an RFID tag to, for example, a handheld transceiver.

Architecture 700 may perform processing in response to processor 720 executing sequences of instructions contained in memory 730. Such instructions may be read into memory 730 from another computer-readable medium, such as storage device 750, or from a separate device via communication interface 780. It should be understood that a computer-readable medium may include one or more memory devices, carrier waves, or data structures. Execution of the sequences of instructions contained in memory 730 may cause processor 720 to perform certain acts that will be described hereafter in conjunction with method diagrams and signal flow diagrams. In alternative embodiments, hardwired circuitry may be used in place of or in combination with software instructions to implement functions performed by architecture 700. Thus, implementations consistent with the invention are not limited to any specific combination of hardware circuitry and software.

Figure 8A:
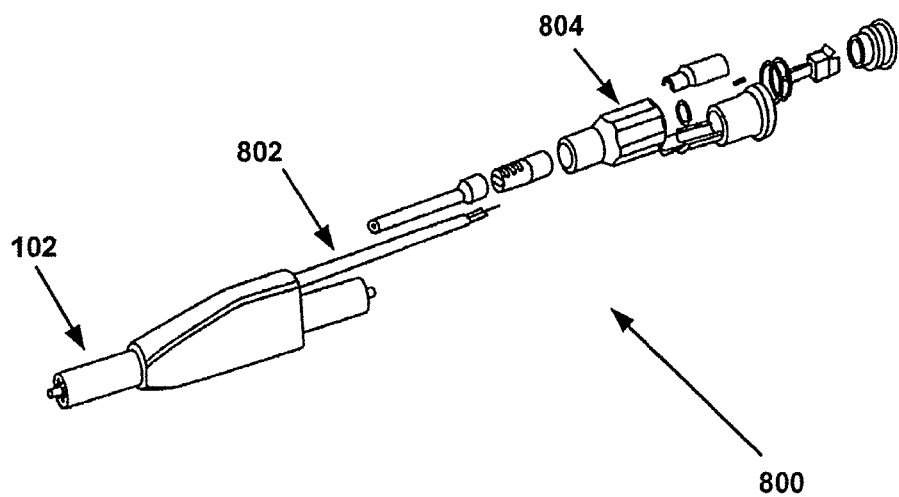
FIGS. 8A and 8B illustrate exemplary implementations of a factory integrated termination utilizing a ruggedized MT connector consistent with the principles of the invention.
Figure 8B:
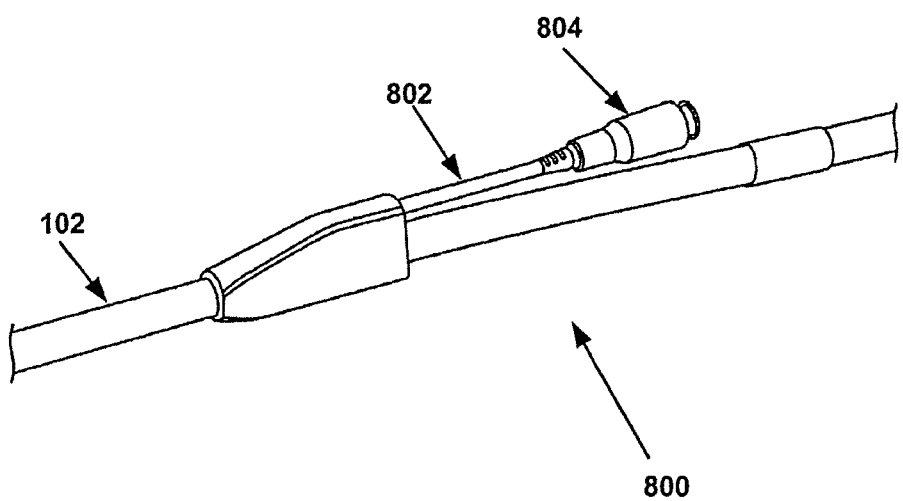

FIGS. 8A and 8B illustrate exemplary implementations of a factory integrated terminations 800 utilizing a ruggedized MT connector consistent with the principles of the invention. Implementations of factory integrated terminations 800 may include tethers 802 that are terminated with connectors. For example, an MT female connector 804 may be installed on a distal end of one or more fibers associated with a ribbon that has been extracted from, or broken out of, a distribution cable 102. Examples of connectors and/or receptacles that may be adapted for use on the distal end of an extracted ribbon are further described in U.S. Pat. Nos. 6,648,520 and 6,579,014, assigned to Corning Cable Systems LLC.

An implementation, such as the one shown in FIG. 8A may include a ribbon tether 804 having four fibers that may be terminated with a single SC/APC connector. Implementations terminated with a connector may be plugged with a mating plug and/or receptacle until one or more subscribers are connected to the tether 802. The mating plug and/or receptacle may act as a dummy plug to protect fibers within the connector from dirt and moisture. The use of connectorized tethers 802 may allow capital expenditures associated with distribution devices, such as fiber drop terminals, to be postponed until subscribers are actually connected to the distribution cable 102.

FIGS. 9A and 9B illustrate an exemplary loop back connector 900 for use in testing factory integrated terminations consistent with the principles of the invention. Implementations terminated with a connector 902 may be plugged with a loop back connector 900 that can be used to facilitate testing of the tether. The loop back plug, or connector, may be configured to couple a first fiber in the tether 904 to a second fiber in the tether 904. At the central office, a test signal can be injected onto the first fiber and detected on the second fiber at the central office. Use of a loop back connector 900 may eliminate shuttling back and forth between a tether 904 and a central office when testing is performed. Eliminating shuttling can produce significant time and cost savings when testing deployed distribution cables 102. An exemplary method of testing a fiber drop terminal from a single location using loop back connectors is shown in U.S. patent application Ser. Nos. 11/198,848 and 11/198,153, assigned to Fiber Optic Network Solutions Corp, the disclosures of which are hereby incorporated by reference.

Figure 9C:
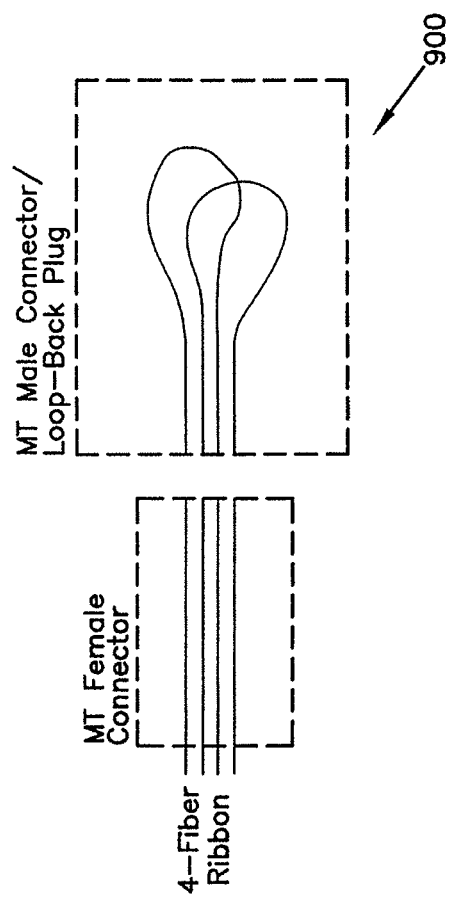
FIG. 9C illustrates a schematic view of the loop back connector of FIGS. 9A and B along with a schematic representation of a four ribbon fiber consistent with the principles of the invention.

FIG. 9C illustrates a schematic view of the loop back connector 900 of FIGS. 9A and 9B along with a schematic representation of a four fiber ribbon consistent with the principles of the invention.

Another aspect of the present disclosure relates to configurations for reducing the size of loop back testing devices and for facilitating the ease of manufacturing loop back testing devices. In one embodiment, a planar lightwave circuit (PLC) is incorporated into the loop back device to provide a loop back function. For example, a planar lightwave circuit can be incorporated into a multi-fiber connector (MFC) assembly for guiding a light signal emitted from one fiber of the MFC back into another fiber of the same MFC.

In this way, the PLC functions to loop signals between fibers of an MFC. By providing this loop back function, test signals can be generated and tested from the same location (e.g., a central office).

It will be appreciated that planar lightwave circuits are well known in the art. For example, planar lightwave circuits and methods for manufacturing planar lightwave circuits are disclosed in U.S. Pat. Nos. 6,961,503; 6,937,797; 6,304,706; 6,787,867; and 6,507,680, the disclosures of which are hereby incorporated by reference in their entireties.

It will be appreciated that PLC technology has numerous advantages. For example, since PLC production is similar to the semiconductor wafer process, the manufacturing costs can be relatively low. Furthermore, PLC technology can have very low insertion losses and consistent insertion loss values between each waveguide path. To make a PLC loop back chip mateable with a standard MFC, the dimensions of the waveguides of the PLC can be designed according to MFC intermateability specifications (e.g., TIA/EIA-604 for a MPO connector). Additionally, alignment features can be fabricated into the PLC chip. In certain embodiments, a predetermined insertion loss can be engineered into the waveguide design with wavelength sensitivity for measurement identification purposes.

FIG. 9D shows a schematic PLC chip 950 including a generally rectangular substrate 952 and a plurality of waveguides/light guides 954. As shown in FIG. 9D, six of the waveguides 954 are shown. Each waveguide 954 has a looped configuration with terminal ends 956 positioned at an interface side 958 of the substrate 952. When the PLC chip 950 is integrated into the ferrule of a loop-back connector, the ends 956 are exposed and adapted to be aligned with corresponding fibers of a multi-termination (MT) connector desired to be optically coupled to the loop-back connector. The PLC chip 950 can include alignment structures (e.g., v-grooves, pin receptacles, pins, or other structures) for ensuring that the ends 956 of the waveguides 954 align with the corresponding fibers of the MT connector to which the PLC chip 950 is optically coupled.

It will be appreciated that the PLC chip 950 can be manufactured by a number of different techniques. In one embodiment, the PLC chip is manufactured by initially providing a bottom substrate including glass having a first index of refraction. An intermediate layer of glass is then deposited over the bottom layer. The intermediate layer preferably has a second index of refraction suitable for a waveguide. The first and second indexes are different from one another. The intermediate layer is then etched to define the waveguides 954. Thereafter, a top layer of glass having an index of refraction comparable to the bottom layer can be applied over the intermediate layer.

It will be appreciated that the thicknesses of the bottom layer and the top layer can be different. For example, the top layer can be thinner than the bottom layer.

The interface side 958 of the PLC chip 950 can be polished to improve performance. Furthermore, the interface side 958 can be angled to match a corresponding angle of a MT connector to which the PLC chip 950 is desired to be optically coupled. In one embodiment, the interface side 958 can be polished at about an 80 degree angle.

Figure 9E:
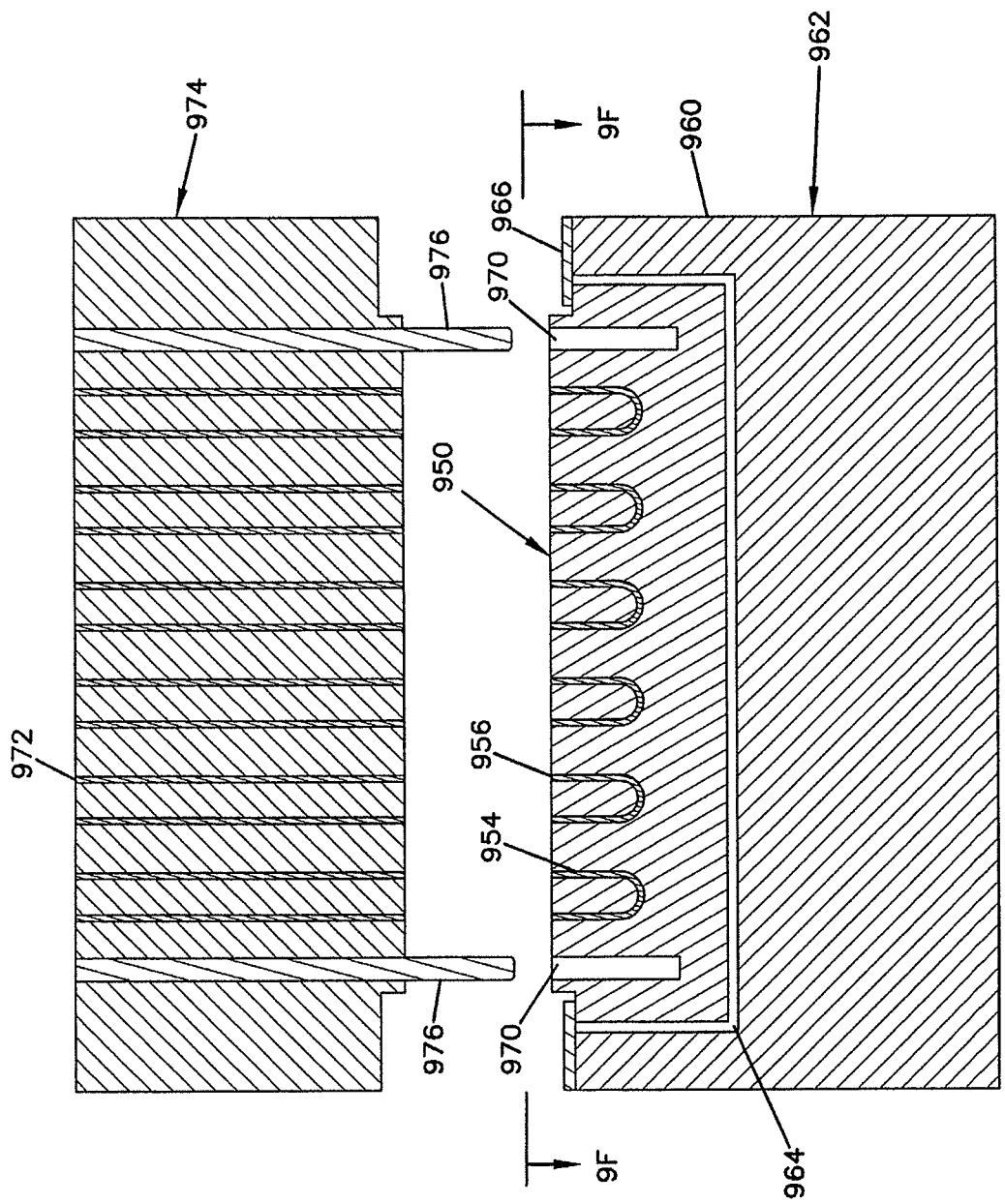
FIG. 9E shows the chip of FIG. 9D incorporated into a ferrule structure of a loop-back connector and also shows a mating connector adapted to be coupled to the loop-back connector.

Referring to FIGS. 9E and 9F, the PLC chip 950 is shown integrated into a ferrule structure 960 of a multi-termination loop-back connector 962. For example, the PLC chip 950 is shown mounted within a receptacle 964 defined within the ferrule structure 960 of the connector 962. A cap 966 or other retaining structure can be used to retain the PLC chip 950 in the receptacle 964. It will be appreciated that the PLC chip 950 can be free to float slightly within the receptacle 964. In certain embodiments, the PLC chip 950 can be spring biased upwardly.

When mounted in the ferrule structure 960, the polished interface side 958 of the PLC chip 950 is exposed. The PLC chip 950 is shown including alignment openings 970 for use in aligning the ends 956 of the waveguides 954 with corresponding fibers 972 of an MT connector 974 to which the multi-termination loop back connector 962 is desired to be coupled. When the multi-termination connector 974 is connected to the multi-termination loop back connector 962 (as shown at FIG. 9G), pins 976 of the multi-termination connector 974 slide within the openings 970 of the PLC chip 950 to ensure alignment between the ends 956 of the waveguides 954 and the ends of the fibers 972. In certain embodiments, it will be appreciated that the ferrule structure 960 can be incorporated into a loop-back connector having a latching arrangement of the type shown at FIG. 9A.

In other embodiments, other types of alignment structures can be used. For example, male alignment structures (e.g., posts) can be provided at the PLC chip to facilitate connecting the loop back connector with a corresponding female MT connector. In still other embodiments, the PLC chip can be provided with v-grooves at the ends of the chip for receiving corresponding pins provided on the connector 524.

Figure 10A:
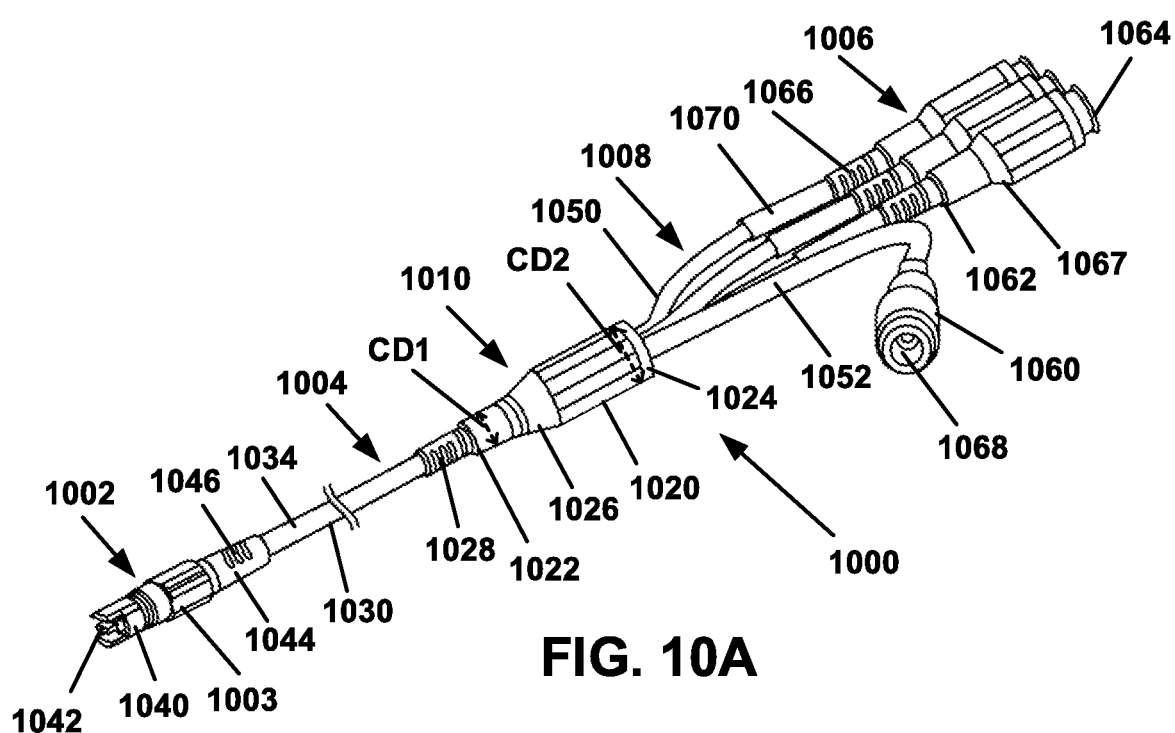
FIGS. 10A and 10B illustrate exemplary implementations of factory integrated terminations employing ruggedized connectors on tethers consistent with the principles of the invention.
Figure 10B:
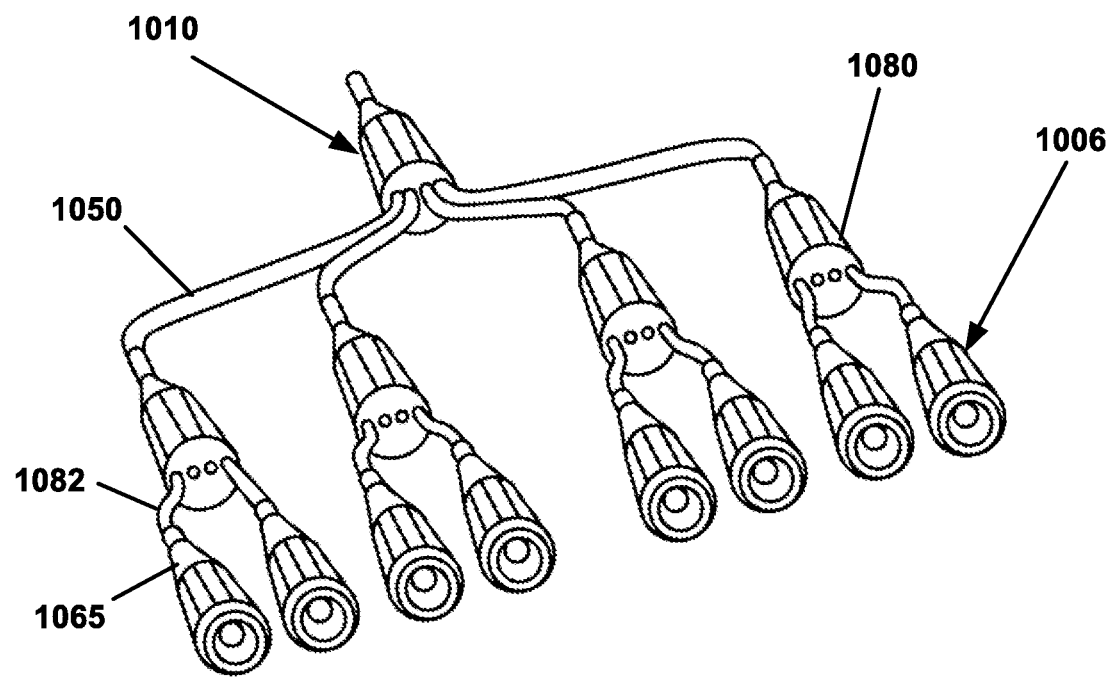
Figure 11A:
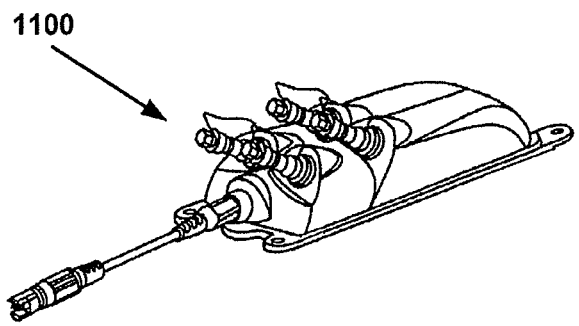
Figure 11B:
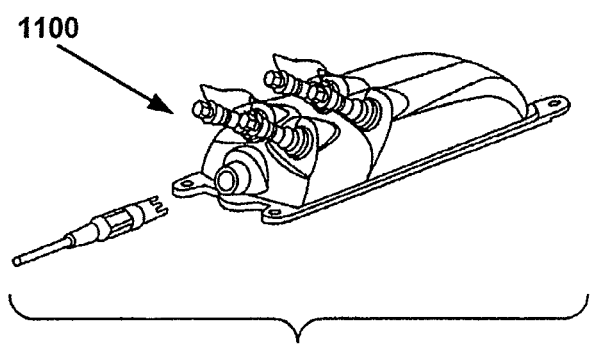

FIGS. 10A and 10B illustrate exemplary implementations of factory integrated terminations 1000 employing ruggedized connectors on tethers consistent with the principles of the invention. The implementations illustrated in FIGS. 10A and 10B may be have an MT connector 1002 on a first end 1004 and one or more single port connectors 1006 on a second end 1008. In an example, the multi-fiber connector 1002 includes a threaded collar 1003. In an example, the single port connectors 1006 may include single-fiber rugged adapters. The first end 1004 may plug into a mating connector associated with a factory integrated termination. The second end 1008 may include connectors for mating with connectors attached to fiber optic cables associated with one or more subscribers. The implementations of FIGS. 10A and 10B may include a breakout 1010 that operates as a transition from a single cable to multiple cables associated with connectors on the second end.

As shown in FIGS. 10A and 10B, the breakout 1010 includes a body 1020 extending between opposite first and second ends 1022, 1024. A cable 1030 extends outwardly from the first end 1022 of the breakout body 1020 to a distal end. A plurality of break-out cables 1050 extend outwardly from the second end 1024 of the breakout 1020 to respective distal ends. The first end 1022 has a smaller transverse cross-dimension than the second end 1024 (compare CD1 at the first end 1022 with CD2 at the second end 1024). The transverse cross-dimension CD2 of the second end 1024 of the breakout 1010 is larger than a total transverse cross-dimension of the break-out cables 1050.

The cable 1030 includes optical fibers disposed within a jacket 1034. The multi-fiber connector 1002 terminates the distal end of the cable 1030. The MT connector 1002 includes a housing 1040 providing access to a ferrule 1042 at a first end of the MT connector 1002 (see FIG. 10A). The ferrule 1042 receives the optical fibers of the cable 1030. The housing 1040 includes a tapered structure 1044 disposed at an opposite second end of the MT connector 1002 so that the cable 1030 extends into the MT connector 1002 through the tapered structure 1044. The tapered structure define notches 1046.

In some implementations, each port connector 1006 terminates the distal end of a respective one of the break-out cables 1050. Each port connector 1006 includes a respective housing 1060 extending between opposite first and second ends 1062, 1064. Each housing 1060 defines a port 1068 at the second end 1064. In the example shown in FIG. 10A, each housing 1060 includes a notched structure 1066 at the first end 1062. The housing 1060 also includes a tapered intermediate structure 1067. A sleeve 1070 extends out of the notched structure 1066 towards the breakout 1010. Each sleeve 1070 terminates before reaching the breakout 1010.

In the example shown in FIG. 10B, each housing 1060 includes a tapered structure 1065 at the first end. The break-out cables 1050 extend to respective optical splitters 1080. A plurality of splitter outputs 1082 extend from each splitter 1080. The port connectors 1006 terminate respective ones of the splitter outputs 1082.

FIGS. 11A-11F illustrate exemplary implementations of factory integrated terminations employing fiber drop terminals 1100 consistent with the principles of the invention. Fiber drop terminals 1100 are further described in U.S. patent application Ser. Nos. 11/198,848 and 11/198,153, assigned to Fiber Optic Network Solutions Corp, the disclosures of which have previously been incorporated by reference. Fiber drop terminals 1100 may operate to provide connection points for fiber optic cables associated with subscribers. Fiber drop terminals 1100 may be attached to structures such as utility poles, buildings, equipment cabinets, etc.

Systems and methods consistent with the invention make possible the fabrication, installation and testing of distribution cables for passive optical networks. For example, a distribution cable may be spliced using factory integrated termination assemblies to provide compact and environmentally sound breakouts to facilitate easy connection of subscribers to a communications network.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts have been described with respect to FIGS. 3 and 4, the order of the acts may be varied in other implementations consistent with the invention. Moreover, non-dependent acts may be implemented in parallel.

For example, implementations consistent with the principles of the invention can be implemented using connectors, receptacles, over-molding techniques, and methods other than those illustrated in the figures and described in the specification without departing from the spirit of the invention. In addition, the sequence of events associated with the methods described in conjunction with FIGS. 3 and 4 can be performed in orders other than those illustrated. Furthermore, additional events can be added, or removed, depending on specific deployments, applications, and the needs of users and/or service providers. Further, disclosed implementations may not be limited to any specific combination of hardware circuitry and/or software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The above specification, examples and data provide a complete description of the manufacture and use of the composition of the invention. Since many embodiments of the invention can be made without departing from the spirit and scope of the invention, the invention resides in the claims hereinafter appended.

The claimed invention is:

1. A fiber optic connection device comprising:
a breakout including a body extending between opposite first and second ends, the first end having a smaller transverse cross-dimension than the second end;
a cable including a plurality of optical fibers disposed within a jacket, the cable extending outwardly from the first end of the breakout to a distal end;
a multi-fiber connector terminating the distal end of the cable, the multi-fiber connector being ruggedized, the multi-fiber connector including a housing providing access to a ferrule at a first end of the multi-fiber connector, the ferrule receiving the optical fibers of the cable, the housing including a tapered structure disposed at an opposite second end of the multi-fiber connector so that the cable extends into the multi-fiber connector through the tapered structure;
a plurality of break-out cables each including a single optical fiber, each of the break-out cables extending outwardly from the second end of the breakout to respective distal ends; and
a plurality of port connectors, each port connector terminating the distal end of a respective one of the break-out cables, each port connector being ruggedized, each port connector including a respective housing extending between opposite first and second ends, each housing including a notched structure at the first end and defining a port at the second end;
the breakout transitioning the cable to the break-out cables.

2. The fiber optic connection device of claim 1, wherein the tapered structure defines notches.

3. The fiber optic connection device of claim 1, wherein the second end of the breakout is larger than a total transverse cross-dimension of the break-out cables.

4. The fiber optic connection device of claim 1, wherein the second end of the breakout defines separate apertures through which the breakout cables extend.

5. The fiber optic connection device of claim 1, further comprising a second notched structure disposed at the first end of the breakout so that the cable extends into the second notched structure to reach the breakout.

6. The fiber optic connection device of claim 1, wherein each port connector includes a ruggedized adapter.

7. The fiber optic connection device of claim 1, further comprising a respective sleeve extending out of the notched structure of each port connector towards the breakout.

8. The fiber optic connection device of claim 7, wherein the each sleeve terminates before reaching the breakout.

9. The fiber optic connection device of claim 1, wherein the housing of each port connector includes a tapered intermediate structure.

10. The fiber optic connection device of claim 1, wherein the multi-fiber connector includes a threaded collar disposed over the housing of the multi-fiber connector.

11. The fiber optic connection device of claim 1, wherein the ferrule of the multi-fiber connector is configured to terminate twelve optical fibers.

12. The fiber optic connection device of claim 1, wherein the housing of the multi-fiber connector includes two paddles extending along opposite sides of the ferrule.

13. The fiber optic connection device of claim 1, wherein the plurality of optical fibers of the cable are configured in a ribbon.

14. The fiber optic connection device of claim 13, wherein the plurality of optical fibers includes four optical fibers.

15. The fiber optic connection device of claim 1, wherein the plurality of optical fibers includes four optical fibers.

16. The fiber optic connection device of claim 1, further comprising a plurality of optical splitters disposed at the distal ends of the break-out cables, each of the optical splitters outputting a plurality of splitter pigtails, each port connector terminating a respective one of the splitter pigtails.

17. The fiber optic connection device of claim 16, wherein each splitter outputs two splitter pigtails.

18. The fiber optic connection device of claim 16, wherein each splitter defines apertures through which the splitter pigtails exit the splitter.

* * * * *